(12) United States Patent
Wang

(10) Patent No.: US 12,058,733 B2
(45) Date of Patent: Aug. 6, 2024

(54) USER EQUIPMENT INITIATED CHANNEL OCCUPANCY TIME (COT) SHARING BETWEEN MULTIPLE USER EQUIPMENTS

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 404 days.

(21) Appl. No.: 17/425,989

(22) PCT Filed: Dec. 6, 2019

(86) PCT No.: PCT/SE2019/051237
§ 371 (c)(1),
(2) Date: Jul. 27, 2021

(87) PCT Pub. No.: WO2020/162804
PCT Pub. Date: Aug. 13, 2020

(65) Prior Publication Data
US 2022/0210827 A1 Jun. 30, 2022

Related U.S. Application Data

(60) Provisional application No. 62/802,422, filed on Feb. 7, 2019.

(51) Int. Cl.
*H04W 74/0808* (2024.01)
*H04W 16/14* (2009.01)
*H04W 76/28* (2018.01)

(52) U.S. Cl.
CPC ....... *H04W 74/0808* (2013.01); *H04W 16/14* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2020/0107277 A1* | 4/2020 | Jeon | H04W 52/228 |
| 2020/0154471 A1* | 5/2020 | Sun | H04W 74/006 |
| 2021/0368351 A1* | 11/2021 | Cui | H04W 74/002 |

OTHER PUBLICATIONS

International Search Report and Written Opinion of the International Searching Authority for PCT International Application No. PCT/SE2019/051237 dated Feb. 27, 2020.

(Continued)

*Primary Examiner* — Anh Ngoc M Nguyen
(74) *Attorney, Agent, or Firm* — Sage Patent Group

(57) ABSTRACT

Systems and methods for wireless device initiated sharing of a Channel Occupancy Time (COT) in a wireless system operating in unlicensed spectrum are disclosed. In some embodiments, a method performed by a wireless device for wireless device initiated sharing of a COT in a wireless system operating in unlicensed spectrum comprises performing a Listen-Before-Talk (LBT) procedure, where a result of the LBT procedure is an LBT success. The method further comprises transmitting, to a base station, one or more messages that initiate COT sharing between the wireless device and one or more additional wireless devices and receiving COT information from the base station. The COT information is information related to a shared COT to be used by the wireless device and one or more additional wireless devices. The method further comprises cooperating with the base station to utilize the shared COT.

20 Claims, 13 Drawing Sheets

(56) References Cited

OTHER PUBLICATIONS

InterDigital Inc., "Configured Grant Enhancements in NR-U," 3GPP TSG RAN WG1 Ad-Hoc Meeting 1901, Taipei, Taiwan, Jan. 21-25, 2019, R1-1900789, 5 pages.
Vivo, "Feature lead summary for Configured grant enhancement," 3GPP TSG RAN WG1 Ad-Hoc Meeting 1901, Taipei, Jan. 21-25, 2019, R1-1901441, 12 pages.
Ericsson, "DL signals and channels for NR-U," 3GPP TSG-RAN WG1 Meeting Ad Hoc 1901, Taipei, Taiwan, Jan. 21-25, 2019, R1-1900996, 8 pages.
3GPP TS 38.321 V15.0.0, "3rd Generation Partnership Project; Technical Specification Group Radio Access Network; NR; Medium Access Control (MAC) protocol specification (Release 15)," Technical Specification, Dec. 2017, 55 pages.
3GPP TS 36.213 V15.1.0, "3rd Generation Partnership Project; Technical Specification Group Radio Access Network; Evolved Universal Terrestrial Radio Access (E-UTRA); Physical layer procedures (Release 15)," Technical Specification, Mar. 2018, 7 pages.
3GPP TR 38.889 V16.0.0, "3rd Generation Partnership Project; Technical Specification Group Radio Access Network; Study on NR-based access to unlicensed spectrum (Release 16)," Technical Report, Dec. 2018, 119 pages.

* cited by examiner

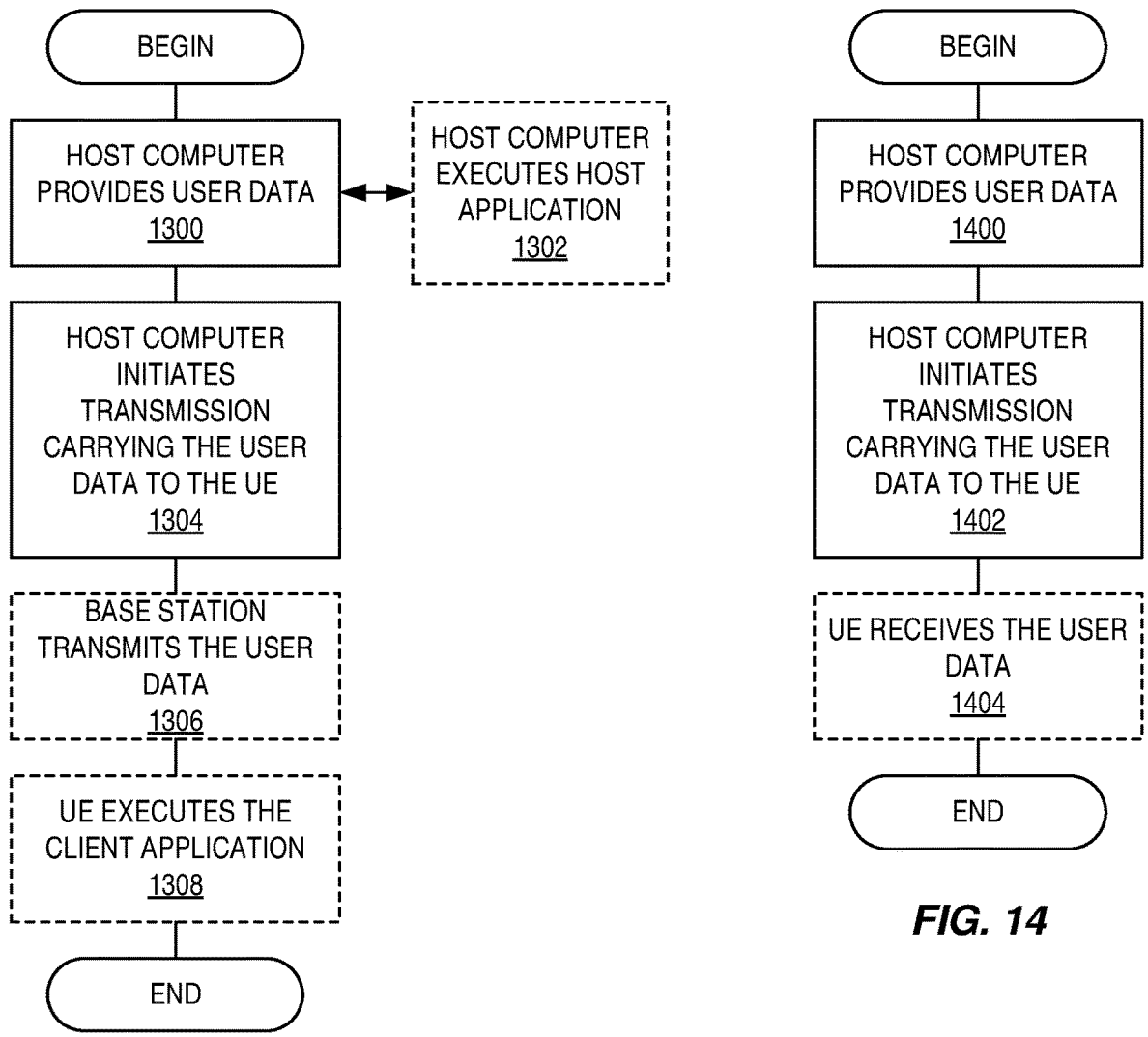

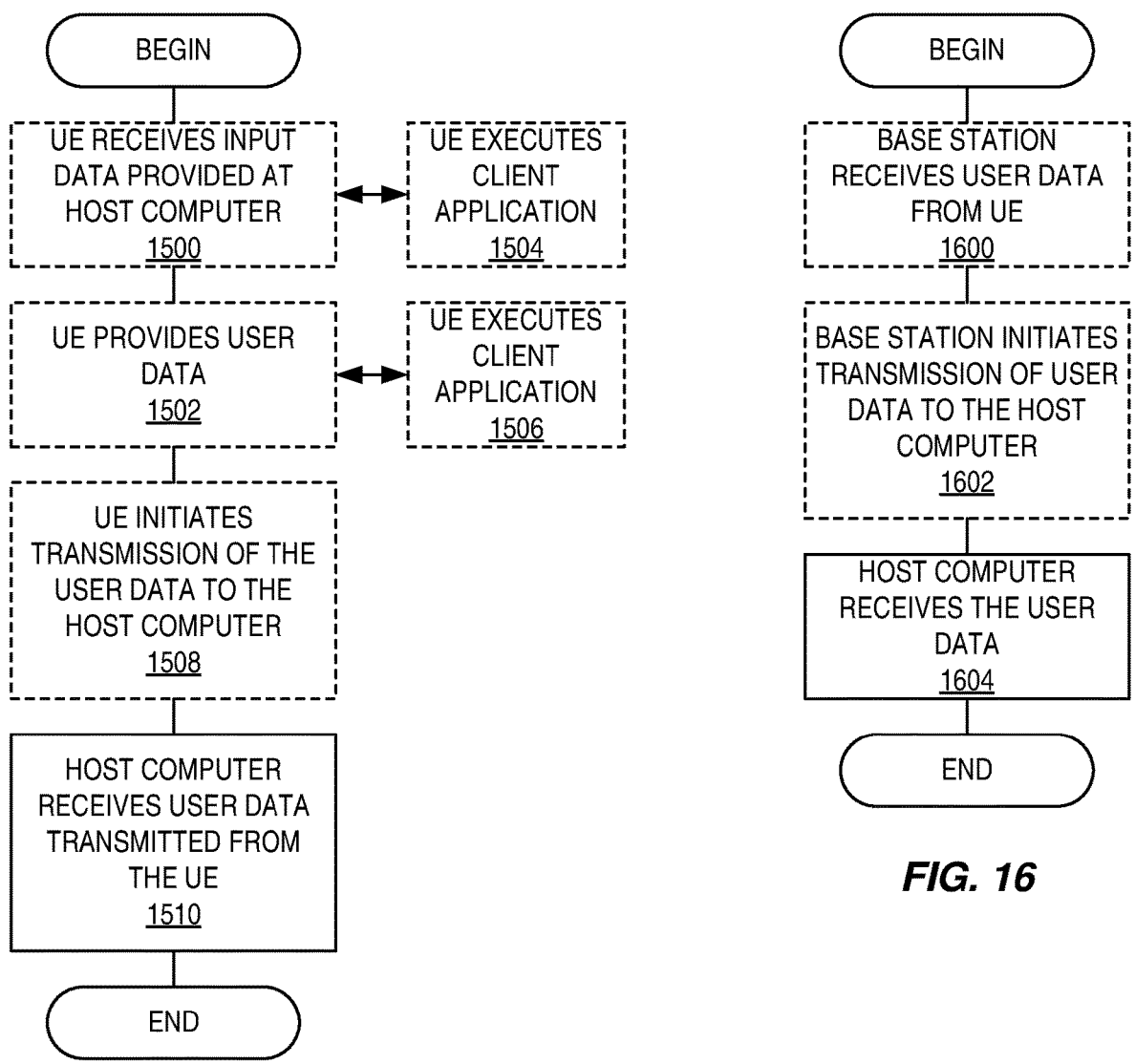

__US 12,058,733 B2__

USER EQUIPMENT INITIATED CHANNEL OCCUPANCY TIME (COT) SHARING BETWEEN MULTIPLE USER EQUIPMENTS

RELATED APPLICATIONS

This application is a 35 U.S.C. § 371 national stage application of PCT International Application No. PCT/SE2019/051237 filed Dec. 6, 2019, which claims the benefit of U.S. provisional patent application Ser. No. 62/802,422, filed Feb. 7, 2019, the disclosures and content of which are incorporated by reference herein in their entireties.

TECHNICAL FIELD

The present disclosure relates to a wireless system operating in unlicensed spectrum and more specifically relates to Channel Occupancy Time (COT) sharing in a wireless system operating in unlicensed spectrum.

BACKGROUND

Next generation systems are expected to support a wide range of use cases with varying requirements ranging from fully mobile devices to stationary Internet of Things (IoT) or fixed wireless broadband devices. The traffic pattern associated with many use cases is expected to consist of short or long bursts of data traffic with varying lengths of waiting periods in between, where a User Equipment (UE) is said to be in an "inactive state" during these waiting periods. In Third Generation Partnership Project (3GPP) New Radio (NR), both License Assisted Access (LAA) and standalone unlicensed operation are to be supported. Hence, the procedure of Physical Random Access Channel (PRACH) transmission and/or Scheduling Request (SR) transmission in unlicensed spectrum is investigated in 3GPP. In the following, NR Unlicensed (NR-U) (i.e., NR in unlicensed spectrum) and a channel access procedure for an unlicensed channel based on Listen-Before-Talk (LBT) is introduced.

In order to tackle the ever increasing data demand, NR is considered for both licensed and unlicensed spectrum. 3GPP has defined a study item on NR-based Access to Unlicensed Spectrum, which was approved at RAN-77. In this study item, compared to the Long Term Evolution (LTE) LAA, NR-U also needs to support Dual-Connectivity (DC) and standalone scenarios, where the Medium Access Control (MAC) procedures including the Random Access Channel (RACH) procedure and scheduling procedure on unlicensed spectrum are subject to LBT failures. There was no such restriction in LTE LAA since there is licensed spectrum in the LAA scenarios such that the RACH and scheduling related signaling can be transmitted on the licensed spectrum instead of unlicensed spectrum.

For Discovery Reference Signal (DRS) transmission such as Primary Synchronization Signal (PSS)/Secondary Synchronization Signal (SSS), Physical Broadcast Channel (PBCH), Channel State Information Reference Signal (CSI-RS), control channel transmission such as Physical Uplink Control Channel (PUCCH)/Physical Downlink Control Channel (PDCCH), physical data channel such as Physical Uplink Shared Channel (PUSCH)/Physical Downlink Shared Channel (PDSCH), and uplink sounding reference signal such as Sounding Reference Signal (SRS) transmission, channel sensing should be applied to determine the channel availability before the physical signal is transmitted using the channel.

The Radio Resource Management (RRM) procedures in NR-U will likely be rather similar to those in LAA since NR-U is aiming to reuse LAA/enhanced LAA (eLAA)/further enhanced LAA (feLAA) technologies as much as possible to handle the coexistence between NR-U and other legacy Radio Access Technologies (RATs). RRM measurements and reporting will include a special configuration procedure(s) with respect to the channel sensing and channel availability.

Hence, channel access/selection for LAA was one of the important aspects for co-existence with other RATs, such as WiFi. For instance, LAA has aimed to use carriers that are congested with WiFi.

In licensed spectrum, the UE measures Reference Signal Received Power (RSRP) and Reference Signal Received Quality (RSRQ) of the downlink radio channel, and provides the measurement reports to its serving enhanced or evolved Node B (eNB) in LTE or to its serving Next Generation Node B (gNB) in NR. However, these measurements do not reflect the interference strength on the carrier. Another metric, Received Signal Strength Indicator (RSSI), can serve such a purpose. At the eNB/gNB side, it is possible to derive RSSI based on the received RSRP and RSRQ reports; however, this requires that RSRP and RSRQ reports must be available. Due to LBT failure, some reports in terms of RSRP or RSRQ may be blocked. This can be either due to the reference signal transmission (DRS) being blocked in the downlink or the measurement report being blocked in the uplink. The measurements in terms of RSSI are very useful. The RSSI measurements together with the time information concerning when and how long that UEs have made the measurements can assist the gNB/eNB to detect a hidden node. Additionally, the gNB/eNB can measure the load situation of the carrier which is useful for the network to prioritize some channels for load balance and channel access failure avoidance purposes.

LTE LAA has been defined to support measurements of averaged RSSI and channel occupancy for measurement reports. The channel occupancy is defined as percentage of time that RSSI was measured above a configured threshold. For this purpose, an RSSI Measurement Timing Configuration (RMTC) includes a measurement duration (e.g., 1-5 milliseconds (ms)) and a period between measurements (e.g., {40, 80, 160, 320, 640} ms).

In regard to the channel access procedure in NR-U, LBT is designed for unlicensed spectrum co-existence with other RATs. In this mechanism, a radio device applies a Clear Channel Assessment (CCA) check (i.e., channel sensing) before any transmission. The transmitter uses Energy Detection (ED) over a time period compared to a certain threshold (ED threshold) to determine if a channel is idle. In case the channel is determined to be occupied, the transmitter performs a random back-off within a contention window before next CCA attempt. In order to protect the Acknowledgement (ACK) transmissions, the transmitter must defer a period after each busy CCA slot prior to resuming back-off. As soon as the transmitter has grasped access to a channel, the transmitter is only allowed to perform transmission up to a maximum time duration, namely, the Maximum Channel Occupancy Time (MCOT). For Quality of Service (QoS) differentiation, a channel access priority based on the service type has been defined. For example, there are four LBT priority classes defined for differentiation of Contention Window Sizes (CWSs) and MCOT between services.

In 3GPP Technical Specification (TS) 38.321-f00, the SR is used for requesting Uplink Shared Channel (UL-SCH) resources for a new transmission. The MAC entity may be configured with zero, one, or more SR configurations. An SR configuration consists of a set of PUCCH resources for SR transmission across different Bandwidth Parts (BWPs) and cells. For a logical channel, at most one PUCCH resource for SR is configured per BWP.

Each SR configuration corresponds to one or more Logical Channels (LCHs). Each LCH may be mapped to zero or one SR configuration, which is configured by Radio Resource Control (RRC). The SR configuration of the LCH that triggers the Buffer Status Report (BSR) (3GPP TS 38.321-f00, subclause 5.4.5), if such a configuration exists, is considered as a corresponding SR configuration for the triggered SR. For BSR triggered by retxBSR-Timer expiry, the corresponding SR configuration for the triggered SR is that of the highest priority LCH, if such a configuration exists, that has data available for transmission at the time the BSR is triggered.

A typical scheduling procedure is illustrated in FIG. 1. In an unlicensed spectrum scenario, the UE or the gNB has to perform a channel sensing or LBT prior to any transmission in this procedure. As illustrated, new data arrives at the UE for transmission, and a BSR and SR is triggered. The UE sends the SR to the gNB. At the gNB, the gNB typically sends a small uplink grant to the UE to let the UE transmit the BSR. Using the grant, the UE transmits the BSR and possibly additional data. The gNB may provide a second uplink grant for the rest of the data.

In regard to Channel Occupancy Time (COT) sharing in NR-U, for a node (e.g., NR-U gNB/UE, LTE-LAA eNB/UE, or WiFi Access Point (AP)/Station (STA)) to be allowed to transmit in unlicensed spectrum (e.g., 5 gigahertz (GHz) band), the node typically needs to perform a CCA. This procedure typically includes sensing the medium to be idle for a number of time intervals. Sensing the medium to be idle can be done in different ways, e.g. using energy detection, preamble detection, or using virtual carrier sensing. The latter implies that the node reads control information from other transmitting nodes informing when a transmission ends. After sensing the medium to be idle, the node is typically allowed to transmit for a certain amount of time, sometimes referred to as Transmission Opportunity (TXOP). The length of the TXOP depends on regulation and type of CCA that has been performed, but typically ranges from 1 ms to 10 ms. This duration is often referred to as a COT.

In WiFi, feedback of data reception ACKs is transmitted without performing CCA. Preceding feedback transmission, a small time duration (called Short Interframe Spacing (SIFS)) is introduced between the data transmission and the corresponding feedback which does not include actual sensing of the channel. In 802.11, the SIFS period (16 microseconds (μs) for 5 GHz Orthogonal Frequency Division Multiplexing (OFDM) PHYs) is defined as:

$$aSIFSTime=aRxPHYDelay+aMACProcessingDelay+aRxTxTurnaroundTime$$

where:
aRxPHYDelay defines the duration needed by the PHY layer to deliver a packet to the MAC layer
aMACProcessingDelay defines the duration that the MAC layer needs to trigger the PHY layer transmitting a response
aRxTxTurnaroundTime defines the duration needed to turn the radio from reception into transmission mode Therefore, the SIFS duration is used to accommodate for the hardware delay to switch the direction from reception to transmission.

It is anticipated that, for NR-U, a similar gap to accommodate for the radio turnaround time will be allowed. For example, this will enable the transmission of PUCCH carrying Uplink Control Information (UCI) feedback as well as PUSCH carrying data and possible UCI within the same TXOP acquired by the initiating gNB without the UE performing CCA before PUSCH/PUCCH transmission as long as the gap between downlink and uplink transmission is less than or equal to 16 μs. Operation in this manner is typically called "COT sharing."

FIG. 2 illustrates TXOPs both with and without COT sharing where CCA is performed by the initiating node (gNB). For the case of COT sharing, the gap between downlink and uplink transmission is less than 16 μs.

SUMMARY

Systems and methods for wireless device initiated sharing of a Channel Occupancy Time (COT) in a wireless system operating in unlicensed spectrum are disclosed. In some embodiments, a method performed by a wireless device for wireless device initiated sharing of a COT in a wireless system operating in unlicensed spectrum comprises performing a Listen-Before-Talk (LBT) procedure, where a result of the LBT procedure is an LBT success. The method further comprises transmitting, to a base station, one or more messages that initiate COT sharing between the wireless device and one or more additional wireless devices and receiving COT information from the base station. The COT information is information related to a shared COT to be used by the wireless device and one or more additional wireless devices. The method further comprises cooperating with the base station to utilize the shared COT. In this manner, wireless devices in the shared COT can avoid performing unnecessary LBT operations.

In some embodiments, the COT information comprises: (a) information that indicates a time when the shared COT starts, (b) information that indicates a time when the shared COT ends, (c) information that indicates a COT category of the shared COT, (d) information that indicates one or more times at which a uplink/downlink switch may occur during the shared COT, (e) information that indicates a maximum number of switch events between uplink and downlink during the shared COT, (f) information that indicates a set of wireless devices are allowed to share the shared COT, the set of wireless devices comprising the wireless device and one or more additional wireless devices, (g) information that indicates services, logical channels, logical channel groups, and/or channel access priority classes that are allowed to transmit within the shared COT, (h) information that indicates what control signaling and/or data is allowed to be transmitted within the shared COT, (i) information that indicates one or more type(s) of LBT operations that can be used in the shared COT, (j) uplink grants associated to wireless devices in the set of wireless devices that are allowed to share the shared COT, (k) information that indicates time positions reserved for potential demodulation reference signal transmissions, or (l) any combination of two or more of (a)-(k).

In some embodiments, the one or more messages that initiate COT sharing comprise: (a) a Scheduling Request (SR) comprising information that indicates (i) one or more services, one or more logical channels, or one or more logical channel groups with data available at the wireless device for transmission and (ii) a buffer status of the data available at the wireless device for transmission, (b) messages for a two-step random access procedure comprising a message that comprises at least a Buffer Status Report (BSR) for data available at the wireless device for transmission, (c) a SR and one or more subsequent BSRs for data available at the wireless device for transmission, or (d) a message(s) comprising Uplink Control Information (UCI), the UCI comprising a BSR for data available at the wireless device for transmission.

In some embodiments, the method further comprises determining that the wireless device is assigned to the shared COT, and adapting Physical Downlink Control Channel (PDCCH) monitoring by the wireless device based on determining that the wireless device is assigned to the shared COT. In some embodiments, determining that the wireless device is assigned to the shared COT comprises determining that the wireless device is assigned to the shared COT based on information comprised in the shared COT information that indicates that the wireless device is one of a set of wireless devices allowed to share the shared COT. In some other embodiments, the method further comprises receiving, from the base station, an indication that the wireless device is allowed to share the shared COT, and determining that the wireless device is assigned to the shared COT comprises determining that the wireless device is assigned to the shared COT based on the received indication. In some embodiments, adapting PDCCH monitoring by the wireless device based on determining that the wireless device is assigned to the shared COT comprises increasing how often the wireless device monitors for a PDCCH transmission from the base station during the shared COT.

In some other embodiments, adapting PDCCH monitoring by the wireless device based on determining if the wireless device is assigned to the shared COT comprises switching a PDCCH monitoring pattern from a first pattern to a second pattern, where the second pattern has different PDCCH monitoring occasions than the first pattern.

In some embodiments, the method further comprises determining that the wireless device is assigned to the shared COT, and adapting a Discontinuous Reception (DRX) configuration of the wireless device based on determining that the wireless device is assigned to the shared COT. In some embodiments, adapting the DRX configuration of the wireless device based on determining that the wireless device is assigned to the shared COT comprises decreasing a DRX cycle length of the DRX configuration of the wireless device or increasing a duration of an active period of the DRX configuration of the wireless device.

In some embodiments, cooperating with the base station to utilize the shared COT comprises cooperating with the base station to perform one or more uplink transmissions during the shared COT. In some embodiments, cooperating with the base station to perform one or more uplink transmissions during the shared COT comprises receiving an uplink grant for an uplink transmission during the shared COT, and transmitting the uplink transmission during the shared COT in accordance with the uplink grant.

In some embodiments, receiving the COT information from the base station comprises receiving the COT information from the base station via any one of the following types of signaling: Downlink Control Information (DCI) based signaling, Medium Access Control (MAC) Control Element (CE) based signaling, higher layer signaling (e.g., Radio Resource Control (RRC) signaling), or downlink feedback information.

In some embodiments, the COT information is signaled in such a manner that the COT information can be read by all wireless devices operating on a respective cell, carrier, Bandwidth Part (BWP), channel, subband, or group.

In some embodiments, wireless device initiated COT sharing is configured per service, logical channel, logical channel group, or channel access priority class.

Embodiments of a wireless device are also disclosed. In some embodiments, a wireless device for wireless device initiated sharing of a COT in a wireless system operating in unlicensed spectrum is adapted to perform a LBT procedure, a result of which is an LBT success. The wireless device is further adapted to transmit, to a base station, one or more messages that initiate COT sharing between the wireless device and one or more additional wireless devices, and receive COT information from the base station, where the COT information is information related to a shared COT to be used by the wireless device and one or more additional wireless devices. The wireless device is further adapted to cooperate with the base station to utilize the shared COT.

In some embodiments, a method performed by a wireless device for sharing of a COT in a wireless system operating in unlicensed spectrum comprises receiving COT information from a base station, where the COT information is information related to a shared COT to be used by one or more wireless devices. The method further comprises determining whether the wireless device is allowed to share the shared COT and either cooperating with the base station to utilize the shared COT or not, based on a result of determining whether the wireless device is allowed to share the shared COT.

In some embodiments, the COT information comprises: (a) information that indicates a time when the shared COT starts, (b) information that indicates a time when the shared COT ends, (c) information that indicates a COT category of the shared COT, (d) information that indicates one or more times at which a uplink/downlink switch may occur during the shared COT, (e) information that indicates a maximum number of switch events between uplink and downlink during the shared COT, (f) information that indicates a set of wireless devices are allowed to share the shared COT, the set of wireless devices comprising the wireless device and one or more additional wireless devices, (g) information that indicates services, logical channels, logical channel groups, and/or channel access priority classes that are allowed to transmit within the shared COT, (h) information that indicates what control signaling and/or data is allowed to be transmitted within the shared COT, (i) information that indicates one or more type(s) of LBT operations that can be used in the shared COT, (j) uplink grants associated to wireless devices in the set of wireless devices that are allowed to share the shared COT, (k) information that indicates time positions reserved for potential demodulation reference signal transmissions, or (l) any combination of two or more of (a)-(k).

In some embodiments, determining whether the wireless device is allowed to share the shared COT comprises determining whether the wireless device is allowed to share the shared COT based on the COT information.

In some embodiments, the COT information comprises information that indicates a set of wireless devices allowed to share the shared COT, and determining whether the wireless device is allowed to share the shared COT comprises determining whether the wireless device is included in the set of wireless devices allowed to share the shared COT.

In some embodiments, the method further comprises receiving, from the base station, an indication that the wireless device is allowed to share the shared COT, and determining whether the wireless device is allowed to share the shared COT comprises determining that the wireless device is assigned to the shared COT based on the received indication.

In some embodiments, determining whether the wireless device is allowed to share the shared COT comprises determining that the wireless device is allowed to share the shared COT, and either cooperating with the base station to utilize the shared COT or not comprises cooperating with the base station to utilize the shared COT upon determining that the wireless device is allowed to share the shared COT. In some embodiments, cooperating with the base station to utilize the shared COT comprises cooperating with the base station to perform one or more uplink transmissions during the shared COT. In some embodiments, cooperating with the base station to perform one or more uplink transmissions during the shared COT comprises receiving an uplink grant for an uplink transmission from the wireless device during the shared COT and transmitting the uplink transmission during the shared COT in accordance with the uplink grant.

In some embodiments, the method further comprises adapting PDCCH monitoring by the wireless device based on a result of determining whether the wireless device is allowed to share the shared COT. In some embodiments, adapting PDCCH monitoring by the wireless device based on the result of determining whether the wireless device is allowed to share the shared COT comprises either increasing or decreasing how often the wireless device monitors for a PDCCH transmission from the base station during the shared COT based on the result of determining whether the wireless device is allowed to share the shared COT. In some other embodiments, adapting PDCCH monitoring by the wireless device based on the result of determining whether the wireless device is allowed to share the shared COT comprises performing PDCCH monitoring during the shared COT using either a first PDCCH monitoring pattern or a second PDCCH monitoring pattern depending on the result of determining whether the wireless device is allowed to share the shared COT.

In some embodiments, the method further comprises adapting a DRX configuration of the wireless device based on a result of determining whether the wireless device is allowed to share the shared COT. In some embodiments, adapting the DRX configuration of the wireless device based on the result of determining whether the wireless device is allowed to share the shared COT comprises adapting an amount of time between DRX activation periods and/or a duration of the DRX activation periods, based on the result of determining whether the wireless device is allowed to share the shared COT.

In some embodiments, receiving the COT information from the base station comprises receiving the COT information from the base station via any one of the following types of signaling: DCI based signaling, MAC CE based signaling, higher layer signaling (e.g., RRC signaling), or downlink feedback information.

In some embodiments, the COT information is signaled in such a manner that the COT information can be read by all wireless devices operating on a respective cell, carrier, BWP, channel, subband, or group.

In some embodiments, a wireless device for wireless device initiated sharing of a COT in a wireless system operating in unlicensed spectrum is adapted to receive COT information from a base station, where the COT information is information related to a shared COT to be used by one or more wireless devices. The wireless device is further adapted to determine whether the wireless device is allowed to share the shared COT and either cooperate with the base station to utilize the shared COT or not, based on a result of determining whether the wireless device is allowed to share the shared COT.

Embodiments of a method performed by a base station are also disclosed. In some embodiments, a method performed by a base station for wireless device initiated sharing of a COT in a wireless system operating in unlicensed spectrum comprises receiving, from a wireless device, one or more messages that initiate COT sharing between the wireless device and one or more additional wireless devices. The method further comprises transmitting COT information, where the COT information is information related to a shared COT to be used by a set of wireless devices assigned to the shared COT. The set of wireless devices assigned to the shared COT comprises the wireless device and one or more additional wireless devices. The method further comprises cooperating with the wireless devices in the set of wireless devices assigned to utilize the shared COT during the shared COT.

In some embodiments, the COT information comprises: (a) information that indicates a time when the shared COT starts, (b) information that indicates a time when the shared COT ends, (c) information that indicates a COT category of the shared COT, (d) information that indicates one or more times at which a uplink/downlink switch may occur during the shared COT, (e) information that indicates a maximum number of switch events between uplink and downlink during the shared COT, (f) information that indicates a set of wireless devices are allowed to share the shared COT, the set of wireless devices comprising the wireless device and one or more additional wireless devices, (g) information that indicates services, logical channels, logical channel groups, and/or channel access priority classes that are allowed to transmit within the shared COT, (h) information that indicates what control signaling and/or data is allowed to be transmitted within the shared COT, (i) information that indicates one or more type(s) of LBT operations that can be used in the shared COT, (j) uplink grants associated to wireless devices in the set of wireless devices that are allowed to share the shared COT, (k) information that indicates time positions reserved for potential demodulation reference signal transmissions, or (l) any combination of two or more of (a)-(k).

In some embodiments, the one or more messages that initiate COT sharing comprise: (a) a SR comprising information that indicates: (i) one or more services, one or more logical channels, or one or more logical channel groups with data available at the wireless device for transmission and (ii) a buffer status of the data available at the wireless device for transmission, (b) a message(s) for a two-step random access procedure comprising a message that comprises at least a BSR for data available at the wireless device for transmission, (c) a SR and one or more subsequent BSRs for data available at the wireless device for transmission, or (d) a message(s) comprising UCI, the UCI comprising a BSR for data available at the wireless device for transmission.

In some embodiments, cooperating with the wireless devices in the set of wireless devices assigned to the shared COT to utilize the shared COT comprises cooperating with the wireless devices in the set of wireless devices assigned to the shared COT to schedule and organize transmissions from the wireless devices during the shared COT. In some embodiments, cooperating with the wireless devices in the set of wireless devices assigned to the shared COT to schedule and organize transmissions from the wireless devices during the shared COT comprises transmitting, to the wireless devices in the set of wireless devices assigned to the shared COT, respective uplink grants for uplink transmissions by the wireless devices during the shared COT, and receiving the uplink transmissions from the wireless devices during the shared COT in accordance with the uplink grants.

In some embodiments, cooperating with the wireless devices in the set of wireless devices assigned to the shared COT to schedule and organize transmissions from the wireless devices during the shared COT comprises cooperating with the wireless devices such that uplink transmissions by the wireless devices are scheduled and organized in such a way that the wireless devices assigned to the shared COT share the shared COT. In some embodiments, cooperating with the wireless devices such that uplink transmissions by the wireless devices are scheduled and organized in such a way that the wireless devices assigned to the shared COT share the shared COT comprises cooperating with the wireless devices such that an uplink transmission from one of the wireless devices during the shared COT does not block an uplink transmission from the other wireless devices during the shared COT.

In some embodiments, cooperating with the wireless devices such that uplink transmissions by the wireless devices are scheduled and organized in such a way that the wireless devices assigned to the shared COT share the shared COT comprises cooperating with the wireless devices such that an uplink transmission from one of the wireless devices during the shared COT occurs at the same time with an uplink transmission from the other wireless devices during the shared COT, using different resources.

In some embodiments, cooperating with the wireless devices in the set of wireless devices assigned to the shared COT to schedule and organize transmissions from the wireless devices during the shared COT comprises cooperating with wireless devices such that a gap between any two consecutive uplink transmissions by the wireless devices assigned that occur during the shared COT is less than a configured time period. In some embodiments, the configured time period is either 16 microseconds (μs) or 25 μs.

In some embodiments, transmitting the COT information comprises transmitting the COT information via any one of the following types of signaling: DCI based signaling, MAC CE based signaling, higher layer signaling (e.g., RRC signaling), or downlink feedback information.

In some embodiments, the COT information is signaled in such a manner that the COT information can be read by all wireless devices operating on a respective cell, carrier, BWP, channel, or subband.

In some embodiments, wireless device initiated COT sharing is configured per service, logical channel, logical channel group, or channel access priority class.

In some embodiments, the method further comprises determining the set of wireless devices to be assigned to the shared COT.

Embodiments of a base station are also disclosed. In some embodiments, a base station for wireless device initiated sharing of a COT in a wireless system operating in unlicensed spectrum is adapted to receive, from a wireless device, one or more messages that initiate COT sharing between the wireless device and one or more additional wireless devices. The base station is further adapted to transmit COT information, where the COT information is information related to a shared COT to be used by a set of wireless devices assigned to the shared COT. The set of wireless devices assigned to the shared COT comprises the wireless device and one or more additional wireless devices. The base station is further adapted to cooperate with the wireless devices in the set of wireless devices assigned to the shared COT to utilize the shared COT.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 13 through 16 are flow charts that illustrate example methods implemented in the communication system of FIG. 11.

DETAILED DESCRIPTION

Figure 1:
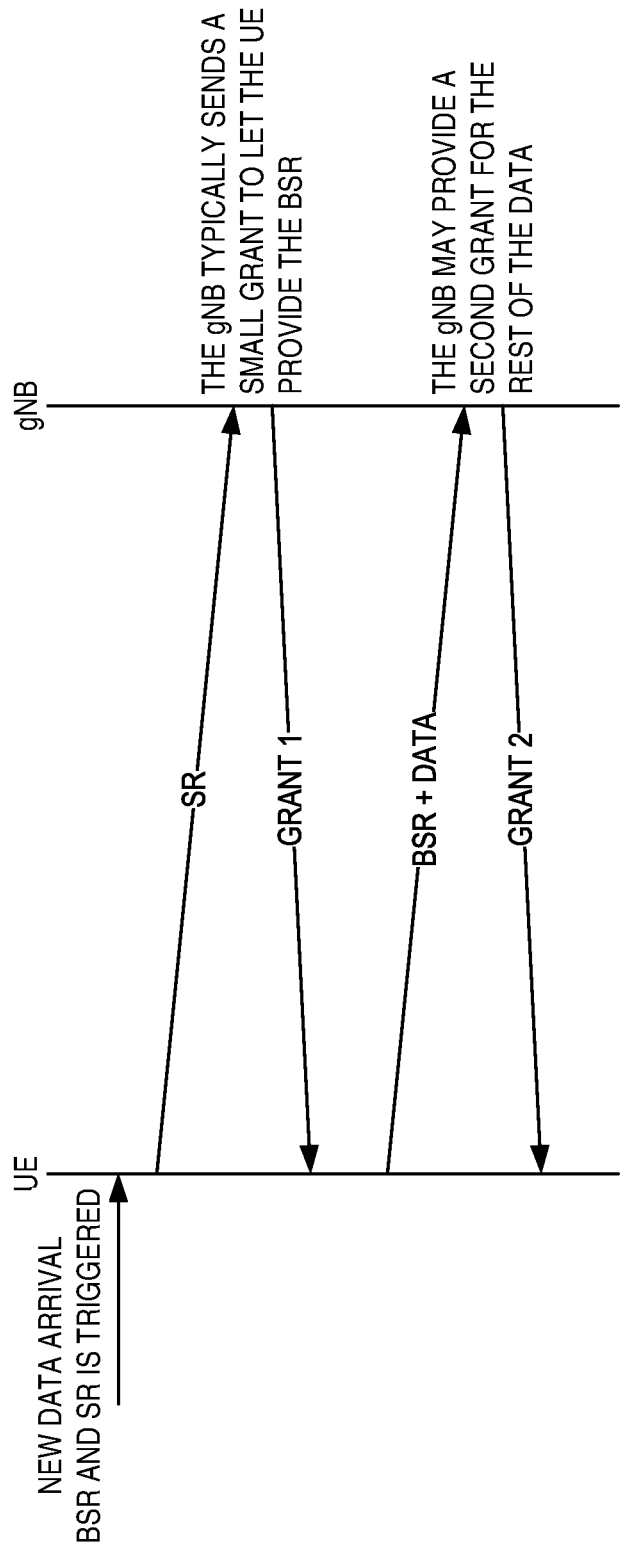
FIG. 1 illustrates a typical scheduling procedure in Third Generation Partnership Project (3GPP) New Radio (NR)
Figure 2:
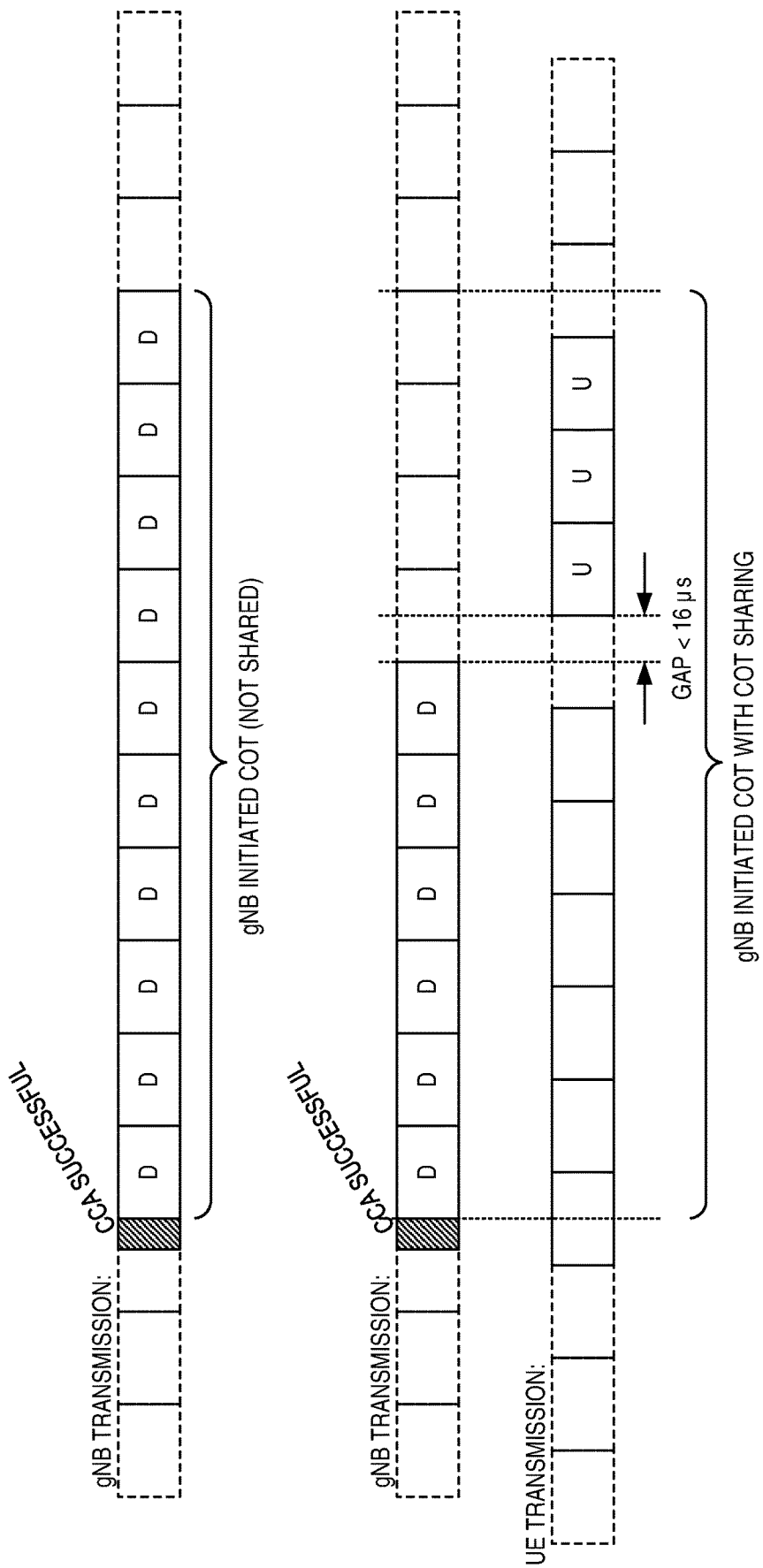
FIG. 2 illustrates Transmit Opportunities (TXOPs) both with and without Channel Occupancy Time (COT) sharing where Clear Channel Assessment (CCA) is performed by the initiating node.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a next generation base station (gNB) in a Third Generation Partnership Project (3GPP) Fifth Generation (5G) New Radio (NR) network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). As captured in the 3GPP Technical Report (TR) 38.889 V16.0.0, within a gNB-initiated Channel Occupancy Time (COT), an uplink burst for a UE consisting of one or more of Physical Uplink Shared Channel (PUSCH), Physical Uplink Control Channel (PUCCH), Physical Random Access Channel (PRACH), and Sounding Reference Signal (SRS) follows the channel access schemes in Table 7.2.1.3.1-3, which is reproduced below.

TABLE 7.2.1.3.1-3

Channel access schemes for a UL burst within a gNB-initiated COT as LBE device

| Cat 1 Immediate transmission | Cat 2 LBT | Cat 4 LBT |
| --- | --- | --- |
| When the gap from the end of the DL transmission to the beginning of the UL burst is not more than 16 μsec. Note: Maximum limits of the duration of the UL burst other than those already derived from MCOT duration limits should be further discussed when specifications are developed. | For any of the following cases: When the gap between any two successive scheduled/granted transmissions in the COT is not greater than 25 μsec For the case where a UL transmission in the gNB initiated COT is not followed by a DL transmission in the same COT Note: the duration from the start of the first transmission within the channel occupancy until the end of the last transmission in the same channel occupancy shall not exceed 20 ms. | N/A |

Note:
An UL burst is defined as a set of transmissions from a given UE having no gaps or gaps of no more than 16 μs. Transmissions from a UE having a gap of more than 16 μs are considered as separate UL bursts. The number of LBT attempts within a COT should be determined when specifications are developed.

Based on the above agreements, NR Unlicensed (NR-U) will support COT sharing between uplink and downlink bursts within a gNB initiated COT duration. This has benefits to reduce the latency due to Listen-Before-Talk (LBT) operations, which is especially useful for delay sensitive services.

It has been also pointed out in 3GPP TR 38.889 V16.0.0 that:

In addition to the functionalities provided by DCI format 2_0 in Rel-15 NR, indication of the COT structure in the time domain has been identified as being beneficial.

It has been proposed in RAN1. (see, e.g., R1-1900996) to use Group Common Physical Downlink Control Channel (PDCCH) (GC-PDCCH) with a potential update to indicate both a downlink burst and the COT structure (e.g., the COT duration and/or the end-of-COT). For example, this information may be used by a UE to control when the UE switches from performing Cat2 LBT (within a shared COT) to CAT4 LBT (outside the COT).

The exact COT structure for uplink/downlink sharing is still under discussion. The inventors have found a few aspects that have not yet been discussed in 3GPP and have merits for potential enhancement of COT sharing to reduce the LBT latency. These aspects are:

Aspect 1: For a COT initiated by a UE, which is mainly for uplink transmission purposes, it may be beneficial to share the COT with downlink transmission(s) or to share the COT with other UEs in the same cell or Bandwidth Part (BWP). Such an aspect has not yet been discussed in 3GPP. Typically, a single UE initiated uplink transmission after a successful LBT operation may block other UEs from performing uplink transmissions, since other UEs may sense the channel as busy. Thus, other UEs may suffer from both additional User Plane (UP) latency due to LBT operations, and reduced spectrum utilization efficiency.

Aspect 2: What will be the COT structure for uplink COT sharing purposes? For any of the above aspects, the Quality of Service (QoS) of services with critical requirements may be degraded. Therefore, proposed solutions to these issues are disclosed herein.

Certain aspects of the present disclosure and their embodiments may provide solutions to the aforementioned or other challenges. Systems and methods are disclosed herein for sharing a UE initiated COT between multiple UEs. In some embodiments, the base station (e.g., gNB for NR) decides which UEs are to share the UE initiated COT. COT information related to the shared COT is signaled to UEs (e.g., all UEs) in the cell/carrier/BWP/channel/subband. Upon reception of the COT information signaling, the UEs that are assigned to the shared COT can organize transmissions based on grants assigned by the base station (e.g., gNB). In some embodiments, the gaps between transmissions are organized in such a way that Category 4 LBT operations can be skipped. In some embodiments, to optimize the battery saving, a Discontinuous Reception (DRX) configuration of a UE and/or PDCCH monitoring of the UE are adapted (e.g., by the UE) based on the received COT information signaling. For example, a UE that is not assigned to a COT can switch to a DRX configuration with less often/shorter activation periods such that energy consumption is reduced.

Certain embodiments may provide one or more of the following technical advantage(s). With proposed mechanisms:

Multiple NR-U UEs in a shared COT intended for uplink transmission purpose can avoid performing unnecessary LBT operations.

An NR-U UE is able to reduce the latency and improve the transmission reliability for services with critical QoS requirements.

UE battery saving is improved with adaptive DRX configuration based on knowledge of COT information.

Figure 3:
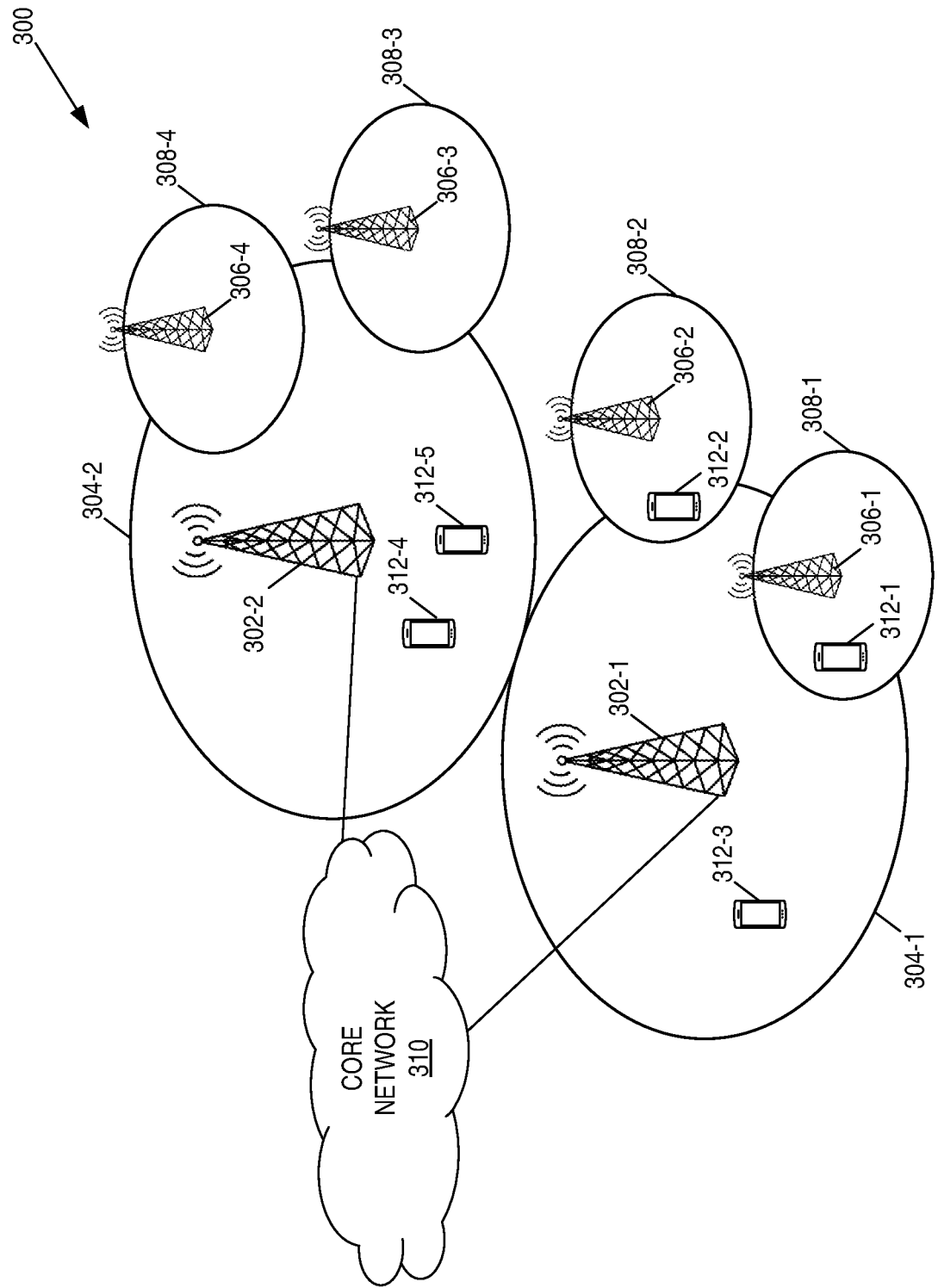
FIG. 3 illustrates one example of a cellular communications network in which embodiments of the present disclosure may be implemented.

In this regard, FIG. 3 illustrates one example of a cellular communications network 300 in which embodiments of the present disclosure may be implemented. In the embodiments described herein, the cellular communications network 300 is a 5G NR network or NR-U network; however the present disclosure is not limited thereto. In this example, the cellular communications network 300 includes base stations 302-1 and 302-2, which in 5G NR are referred to as gNBs, controlling corresponding macro cells 304-1 and 304-2. The base stations 302-1 and 302-2 are generally referred to herein collectively as base stations 302 and individually as base station 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

In the embodiments described herein, at least some of the cells 304 and/or at least some of the cells 308 are NR-U cells (i.e., NR cells operating in unlicensed spectrum).

Now, a more detailed description of embodiments of the present disclosure will be given. Note that the embodiments described below are described in the context of NR-U. However, the solutions described herein are not limited to NR-U scenarios. They are also applicable to other unlicensed operation scenarios such as LTE License Assisted Access (LAA)/enhanced LAA (eLAA)/further enhanced LAA (feLAA).

NR-U uses configurable LBT schemes, which comprise at least one of the LBT categories listed below (also referred to as Type 1 or Type 2 channel access in the 3GPP specifications, e.g., Technical Specification (TS) 36.213-f00), but not limited to below examples;

Category 1: No LBT
Category 2: LBT without random back-off
Category 3: LBT with random back-off with fixed size of contention window
Category 4: LBT with random back-off with variable size of contention window Specifically for Category 4 LBT, in order to provide differentiation to channel access priorities based on the type of traffic served (e.g., Voice over Internet Protocol (VoIP), video, best effort, or background), four LBT priority classes are defined with different Contention Window Sizes (CWSs) and Maximum Channel Occupancy Times (MCOTs). Note that after the transmitter has gained access to the channel, the transmitter is only allowed to transmit for a limited duration, referred to as the MCOT. Table 1 summarizes the MCOT and CWS for the downlink channel access priority classes, while Table 2 summarizes the MCOT and CWS for the uplink channel access priority classes. Both tables are abstracted from the Table 15.1.1-1 and the Table 15.2.1-1 in 3GPP TS 36.213 V15.1.0.

In this disclosure, the same channel access priority class for LBT operations is applied in the embodiments described herein. However, we are not limited to above examples.

TABLE 1

Channel Access Priority Class

| Channel Access Priority Class | MCOT | allowed CWS sizes |
|---|---|---|
| 1 | 2 ms | {3, 7} |
| 2 | 3 ms | {7, 15} |
| 3 | 8 or 10 ms | {15, 31, 63} |
| 4 | 8 or 10 ms | {15, 31, 63, 127, 255, 511, 1023} |

TABLE 2

Channel Access Priority Class for UL

| Channel Access Priority Class | MCOT | allowed CWS sizes |
|---|---|---|
| 1 | 2 ms | {3, 7} |
| 2 | 4 ms | {7, 15} |
| 3 | 6 ms or 10 ms | {15, 31, 63, 127, 255, 511, 1023} |
| 4 | 6 ms or 10 ms | {15, 31, 63, 127, 255, 511, 1023} |

As a first embodiment, a methodology is proposed to enable a shared COT between multiple UEs. The shared COT is initiated (also referred to herein as "requested") by at least one transmitting UE intended for uplink transmission purpose. COT structure information (also referred to herein as "COT information") is signaled by the gNB in the respective cell, carrier, BWP, channel, or subband. Preferably, all UEs in Radio Resource Control (RRC) connected or RRC inactive in the cell, carrier, BWP, channel, or subband are able to read the signaling. The COT structure information may contain/indicate information such as any combination of one or more of the following information:

information that indicates the time when the COT starts,
information that indicates the time when the COT ends,
information that indicates the COT category, i.e., gNB initiated COT or UE initiated COT,
information that indicates the time when an uplink/downlink switch may occur,
information that indicates a maximum number of switch events between uplink and downlink,
information that indicates the UEs (e.g., UE Identifiers (IDs)) that are allowed to share (i.e., use) the COT,
information (e.g., indices) that indicates services, logical channels, logical channel groups, and/or channel access priority classes that are allowed to transmit within the COT,
information that indicates what control signaling and/or data is allowed to transmit within the COT,
information that indicates the type(s) of LBT operations that can be used in the COT, e.g., one or more of the categories of LBT operations defined above,
uplink grants associated to the UEs who are allowed to use the COT (e.g., dynamic uplink grants or configured uplink grants can be included here), where in this case the gNB has, at the time of generating the COT information, at least some information regarding the buffer status at the UEs assigned to the shared COT (e.g., via prior received Scheduling Request(s) (SR(s))/Buffer Status Report(s) (BSR(s)) from those UEs), and/or information that indicates time positions reserved for potential Discovery Reference Signal (DRS) transmissions.

In this way, the UEs sharing the same uplink COT may reduce or avoid LBT operations. Both latency and spectrum utilization efficiency are improved.

As a second embodiment, a shared COT is initiated by at least one transmitting UE via at least one of below alternatives:

Alternative 1: In this alternative, the shared COT is initiated by the at least one transmitting UE by transmission of a PUCCH-SR indicating both: (a) services, Logical Channels (LCHs), or Logical Channel Groups (LCGs) with data available for transmission and (b) a buffer status of the associated data. With the indication of the buffer status, the gNB can assign a COT for one or several UEs based on received buffer status without collecting further information on buffer status based on subsequent BSRs. The received buffer status may be the received buffer status of multiple UEs. In some examples, the gNB has received SRs/BSRs from multiple UEs in a short amount of time, and the gNB assigns these UEs to the shared COT. In this alternative, the gNB can assign a shared COT for relevant UEs immediately upon reception of an SR. In the existing LTE LAA and NR licensed, a trigger of a PUCCH-SR only indicates availability of the new data for an LCH. This means that some necessary enhancements regarding PUCCH-SR are needed in order to indicate the buffer status. In one example, a UE can be assigned with multiple PUCCH-SR resources (in frequency or time domain) for a LCH, where each PUCCH-SR resource is associated with a specific buffer level. The UE triggers a corresponding SR based on the buffer level of the new data. In another example, the current single-bit PUCCH-SR is extended to a multiple-bit SR. Then, using these multiple bits, more information (e.g., an indication of the buffer level) can be carried in the SR.

Alternative 2: In this alternative, the shared COT is initiated by the at least one transmitting UE by transmission of a 2-step Random Access (RA). In MsgA, a BSR and/or a Power Headroom Report (PHR) can be carried in the payload. In this alternative, a 2-step RA is triggered instead of a PUCCH-SR due to arrival of new data or arrival of higher priority data, since a 2-step RA is able to carry a BSR or a PHR in the payload. Note that the 2-step RA is a procedure currently under study in 3GPP in which the conventional Msg1 (RA preamble) and Msg3 are transmitted together as one message in the 2-step RA procedure.

Alternative 3: In this alternative, the shared COT is initiated by the at least one transmitting UE by transmission of an SR plus subsequent BSRs. The UE first transmits an SR indicating the presence of the data for transmission. The gNB replies with a grant so that the UE can provide a more detailed buffer status by including a BSR in the subsequent data transmission.

Alternative 4: In this alternative, the shared COT is initiated by the at least one transmitting UE by transmitting, to the gNB, an extended Uplink Control Information (UCI) that carries priority indicators and/or buffer status for a UE.

With Alternative 1 and Alternative 2, the UE may not need to transmit BSRs in subsequent data transmissions after the first transmission of the SR or RA preamble in order for the gNB to assign a COT to the UE, which may be shared with other UEs. With Alternative 3, the gNB may need to use both an SR and a subsequent BSR to learn the current full buffer status for a UE. For all alternatives, the gNB can estimate a time period of a COT which is shared between several UEs (e.g., the gNB can estimate the duration of the shared COT based on, e.g., buffer status). Within this shared COT, these UEs can manage to empty their buffers given their uplink radio link quality and power headroom.

In some embodiments, the UEs that are assigned to the shared COT are scheduled based on an improved scheduling strategy, such that the scheduling decision for UEs in the shared COT may be valid for the whole COT period. In other words, the other UEs will not be scheduled during this COT period. While in an ordinary scheduling procedure, a scheduling decision for a UE is typically valid for just one scheduling period (e.g., Transmission Time Interval (TTI) or slot). For each COT based scheduling occasion, the UEs in the cell may be requested by the gNB to transmit SRS and PHR before a COT scheduling decision is made.

As a third embodiment, in case one or several UEs have received a signaling indicating that a COT is assigned to them, the UEs then adapt their PDCCH monitoring to increase PDCCH monitoring. For example, those UEs may switch from a first PDCCH monitoring pattern (e.g., an infrequent PDCCH monitoring pattern) to second PDCCH monitoring pattern (e.g., a more frequent PDCCH monitoring pattern) that results in increased PDCCH monitoring. Whenever each of these UEs receives a grant (either a dynamic grant or a configured grant) within the indicated shared COT period, the UE prepares a Medium Access Control (MAC) Protocol Data Unit (PDU) and triggers a transmission accordingly. In some embodiments, within the shared COT period, both the gNB and the UEs joining the shared COT period schedule or organize transmissions within the shared COT considering the following aspects:

Multiple UEs are allowed to use the medium/channel at the same time period (e.g., they may use different frequency resources) during the shared COT. As a result, resource utilization is improved. Also, the transmissions within the shared COT are scheduled or organized in such a manner as to avoid a situation in which a single UE occupies the channel and blocks other UEs from accessing the channel.

The transmissions in the shared COT are scheduled or organized such that the gap between any two consecutive transmissions is less than a configured time period (e.g., 16 microseconds (µs) or 25 µs). In this way, either Category 1 or Category 2 LBT can be chosen to avoid latency incurred by usage of Category 4 LBT operations.

As a fourth embodiment, for UEs that are not assigned to the shared COT by the gNB, meaning that these UEs may be scheduled with lower priorities, wait to be scheduled after the current on-going shared COT. Further, these UEs can switch to an infrequent PDCCH monitoring pattern until the current COT period has expired, e.g., for power saving purposes. After expiration of the current on-going COT, these UEs can switch to a more frequent PDCCH monitoring pattern to prepare for reception of downlink signaling related to the next COT, which may be intended to them. If those UEs are again not assigned to the next shared COT, the UEs can switch back to an infrequent PDCCH monitoring pattern again. Conversely, if one or more of the UEs are assigned to the next shared COT, then those UEs continue using the more frequent PDCCH monitoring pattern or may even switch to an even more frequent PDCCH monitoring pattern to prepare for the data transmission. For each COT, there may be a gap period at the beginning or at the end of the COT period, where the gap is reserved for UEs to transmit SR, BSR, and/or UCI to request resources, and/or for the gNB to transmit downlink signaling such as a Downlink Control Information (DCI) signaling to start a new COT (either for downlink transmission or a uplink shared COT for multiple UEs).

As a fifth embodiment, the COT information for sharing between multiple UEs may be signaled by a gNB via any one of the following example alternatives:

DCI based Signaling: In this alternative, the gNB signals the COT information to the UEs using DCI. This DCI may, e.g., be based on the DCI format 2_0, which is a group common PDCCH format. In some embodiments, the DCI format is updated to include the COT information for uplink UEs.

MAC Control Element (CE) based Signaling: In this alternative, the gNB signals the COT information to the UEs using a new MAC CE. The MAC CE may, for example, have the name "COT indicator" or "COT information".

RRC Signaling Message: In this alternative, the gNB signals the COT information to the UEs using a new RRC signaling message that includes the COT information. For example, the new RRC signaling message may be named, for example, "COT information".

Downlink Feedback Information (DFI): DFI is defined for configured scheduling in NR-U. In this alternative, the gNB signals the COT information to the UEs using an extension to the existing DFI format that includes the COT information for UEs with available configured grants.

The COT information is preferably signaled in the cell, carrier, BWP, channel, or subband such that all UEs can read the signaling to determine whether there is a shared COT scheduled in the cell, carrier, BWP, channel, subband, or group. In addition, the gNB signals each UE to indicate to the UE whether the UE is assigned to the shared COT. For example, in some embodiments, the COT information includes information that indicates the UEs that are assigned to the shared COT (e.g., the COT information signaling includes the UE IDs of the UEs assigned to the shared COT). As another example, each UE decides if it is assigned to the shared COT via a second signaling. The second signaling may be a dedicated DCI. In this option, a UE first detects if there is a shared COT indicated by the gNB via the COT information. After that, the UE can further decide if it is assigned to the shared COT via the reception of a second signaling (e.g., reception of DCI including an uplink grant for the UE during the shared COT). There may be multiple second signaling messages for a UE during a COT period. Each signaling message may indicate a new grant.

Figure 4:
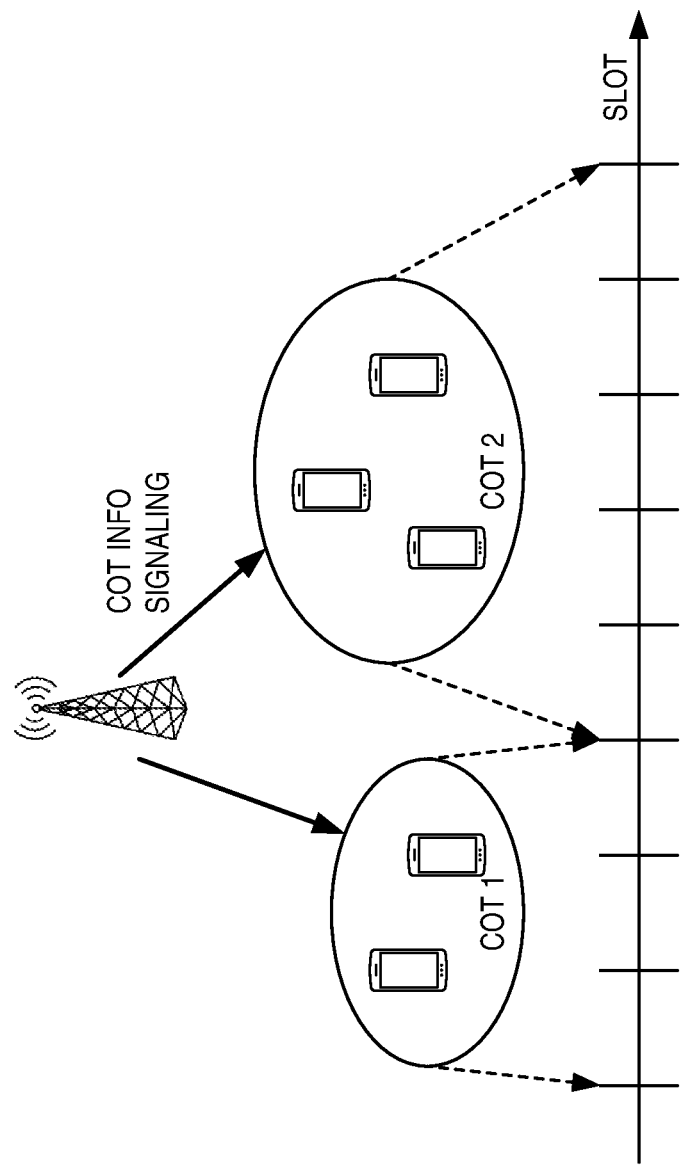
FIG. 4 illustrates one example of User Equipment (UE) COT sharing for multiple UEs in accordance with embodiments of the present disclosure.

FIG. 4 illustrates one example of COT sharing. In this example, a first COT (COT1) is shared by two UEs and spans three slots in time, and a second COT (COT2) is shared by three other UEs and spans five slots in time. It is worth noting that each COT period may comprise a gap period at the beginning of the COT or the end of the COT, where this gap allows for the gNB or some UEs to perform LBT operation for any potential downlink or uplink signaling.

As a sixth embodiment, a UE adapts its DRX activity (also referred to herein as its DRX configuration) based on received COT signaling. In one example, a UE applies a first DRX configuration (e.g., a DRX configuration with less often and/or shorter active periods) during the time periods when the UE is not assigned to a shared COT, while the UE applies a second DRX configuration (e.g., a DRX configuration with more often and/or longer active periods) during the time periods when the UE is assigned to a shared COT. In other words, reception of a COT assignment signaling would trigger the UE to switch or adapt its DRX configuration. In some embodiments, the DRX configuration is reconfigured for a UE every time with an RRC reconfiguration message. In some other embodiments, multiple DRX configurations are pre-configured for the UE, and the UE chooses a suitable DRX configuration depending on whether the UE is assigned to a shared COT or not assigned to a shared COT. In some further embodiments, the DRX configuration chosen by the UE may be indicated to the gNB, and the gNB can decide whether to accept or decline the chosen DRX configuration. In case the gNB declines a DRX configuration chosen by a UE, the gNB may indicate another DRX configuration to the UE.

As a seventh embodiment, for any of the above embodiments, the proposed COT sharing function can be configured per service, LCH, LCG, or Channel Access Priority Class (CAPC) so that the function may be only applicable to services with critical QoS requirements. The configuration may be signaled via system information, dedicated RRC signaling, a MAC CE, or a DCI.

Figure 5:
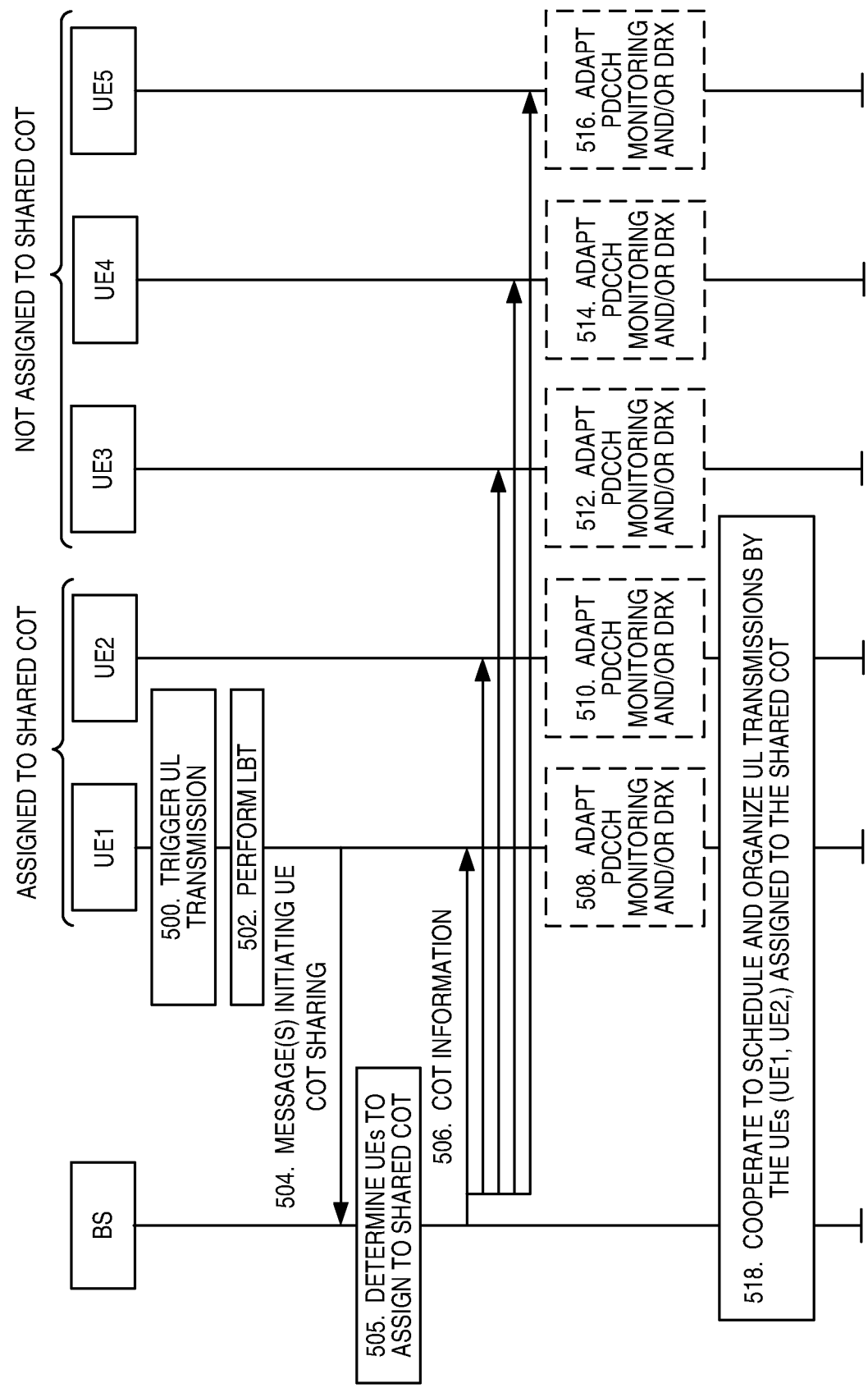
FIGS. 5 and 5A illustrate the operation of a base station and a number of UEs to provide UE-initiated COT sharing in accordance with some embodiments of the present disclosure.
Figure 5A:
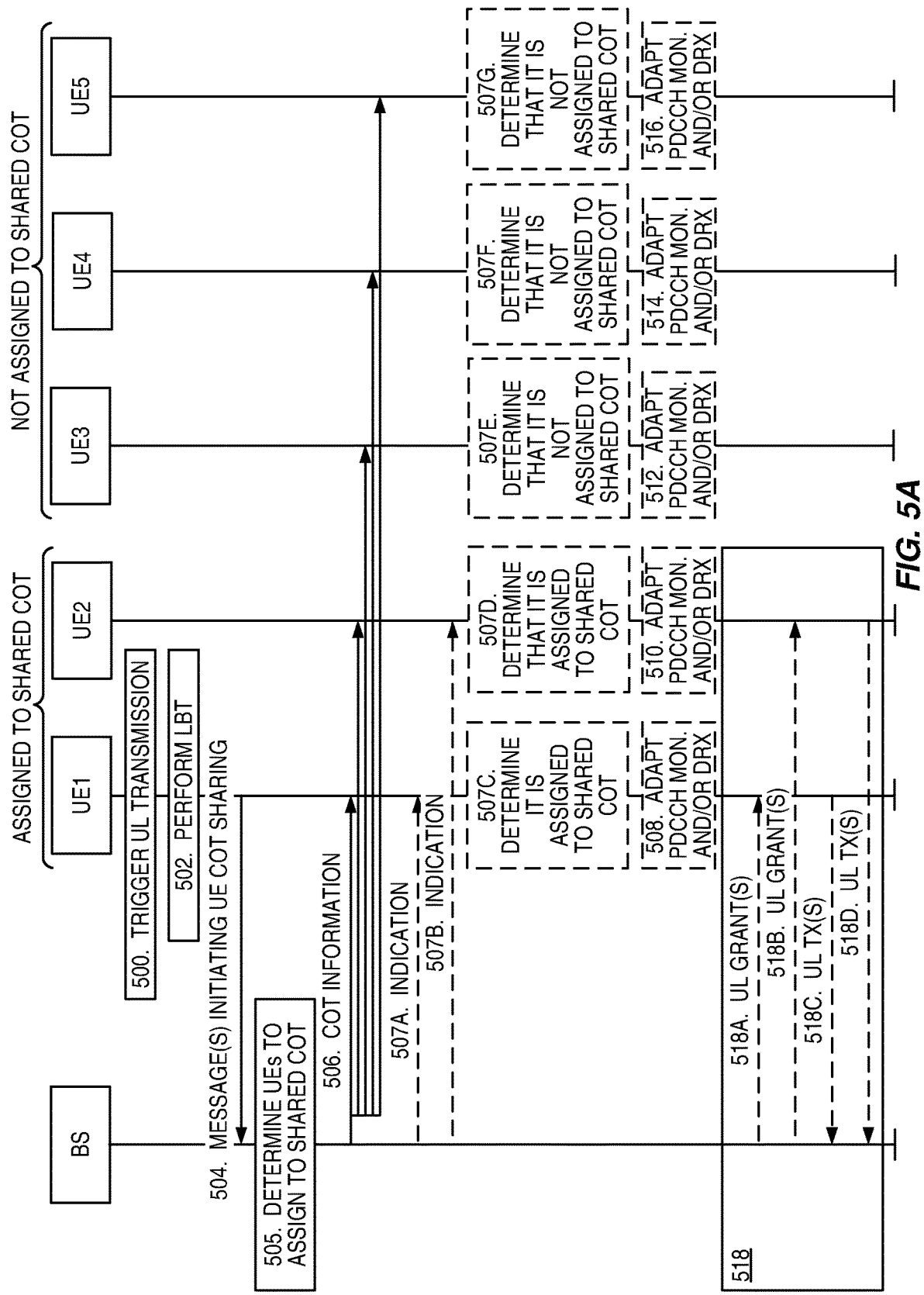

FIG. 5 illustrates the operation of a base station (e.g., base station 302 such as, e.g., a gNB) and UEs (e.g., wireless devices 312) to provide COT sharing by multiple UEs in accordance with at least some aspects of at least some of the embodiments described above. Optional steps are represented by dashed lines. FIG. 5A is similar to FIG. 5, but used specifically to illustrate some optional or implicit actions referred to below in the description of FIG. 5.

In this example of FIGS. 5 and 5A, for simplicity and ease of discussion, there are five UEs, denoted as UE1 through UE5. As illustrated, an uplink transmission is triggered at UE1 (step 500). UE1 then performs an LBT procedure (step 502). In this example, the LBT procedure is successful. As such, UE1 transmits a message(s) to initiate or request a shared COT (step 504). As discussed above, the message(s) may include a message(s) in accordance with any one of the following example alternatives:

a PUCCH-SR indicating both services, LCHs, or LCGs with data available for transmission and a buffer status of the associated data;

messages for a 2-step RA including a message that carries a BSR;

messages including a SR plus subsequent BSR(s);

a message containing UCI, where the UCI includes a buffer status for the UE.

There are also other UEs that may also send one or several messages as above to request resources at that time period.

Based on the received message(s), the base station decides which UEs are to be assigned to a shared COT to be shared by the UE and one or more additional UEs for uplink transmission (step 505), generates COT information for the shared COT, and signals the COT information to all of the UEs, which in this example are UE1, UE2, UE3, UE4, and UE5 (step 506). The base station may use any appropriate scheme for deciding which UEs to assign to the shared COT. For example, the base station may select the UEs to be assigned to the shared COT based on ordinary scheduling procedures. Those UEs may have similar traffic patterns, so they may send SRs/BSRs in a burst period. In this example, UE1 and UE2 are assigned to the shared COT, and UE3, UE4, and UE5 are not assigned to the shared COT. Notably, because the shared COT is initiated by a UE, the shared COT is also referred to herein as a UE-initiated shared COT. Also note that while, in this example, the base station determines the UEs to be assigned to the shared COT prior to generating and signaling the COT information, the present disclosure is not limited thereto. Further, while the COT information is generally described herein as being signaled via a single signaling message, the present disclosure is not limited thereto. The COT information may be signaled via two or more messages. Further, if signaled by two or more messages, the different messages may be signaled at different points in the process. For instance, the base station may send a portion of the COT information including, e.g., information that defines the start time and/or end time of the shared COT in step 506, thereafter receive messages (e.g., SRs and/or BSRs) from UEs that desire to use the shared COT, and then determine which of those UEs to assign to the shared COT (e.g., based on any desired criteria such as, e.g., the amount of data available for transmission at the UEs, priorities assigned to the UEs, or the like).

As discussed above, the COT information may include, e.g., information that indicates the time when the COT starts, information that indicates the time when the COT ends, information that indicates the COT category, i.e., gNB initiated COT or UE initiated COT, information that indicates the time when a uplink/downlink switch may occur, information that indicates a maximum number of switch events between uplink and downlink, information that indicates the UEs (e.g., UE IDs) that are allowed to share (i.e., use) the COT, information (e.g., indices) that indicates services, logical channels, logical channel groups, and/or channel access priority classes that are allowed to transmit within the COT, information that indicates what control signaling and/or data is allowed to transmit within the COT, information that indicates the type(s) of LBT operations that can be used in the COT, e.g., one or more of the categories of LBT operations defined above, uplink grants associated to the UEs who are allowed to use the COT (e.g., dynamic uplink grants or configured uplink grants can be included here), and/or information that indicates time positions reserved for potential DRS transmissions. As discussed above, the base station may signal the COT information to the UEs using any appropriate signaling such as, e.g., DCI based signaling, MAC CE based signaling, RRC signaling, or DFI. In regard to the type(s) of LBT operations that can be used in the shared COT, in some embodiments, the types of operations that can be used are LBT type 1 or LBT type 2 depending on the switch gap. For example, if the switching gap is less than 16 μs, the UE uses Type 1/Cat 1, meaning no LBT; if the gap is larger than 16 μs, however shorter than 25 μs, the UE uses type 2 LBT, i.e., 25 μs LBT operation. Thus, in some embodiments, by including the type(s) of LBT operations that can be used in the COT information, flexibility is provided on choice of LBT operation.

In this example UE1 and UE2 are assigned to the shared COT, and UE3, UE4, and UE5 are not assigned to the shared COT. Each of the UEs receives the COT information.

In some embodiments, the COT information includes information that indicates which UEs are assigned to the shared COT. In this case, each of the UEs reads the COT information, determines whether it is assigned to the shared COT (see FIG. 5A, steps 507C-507G), and optionally adapts its PDCCH monitoring and/or its DRX configuration based on whether it is assigned to the shared COT (steps 508, 510, 512, 514, 516). In some other embodiments, additional signaling is used to indicate to each of the UEs whether it is assigned to the shared COT, as discussed above. For example, see FIG. 5A, steps 507A and 507B and note that similar indications may be sent to UE3, UE4, and UE5 to indicate that they are not assigned to the shared COT.

During the shared COT, the base station and the UEs assigned to the shared COT (UE1 and UE2, in this example) cooperate to schedule or organize uplink transmissions from those UEs during the shared COT such that the UEs share the same cell, carrier, BWP, channel, subband, or group during the shared COT (step 518). In addition, the uplink transmissions from those UEs during the shared COT are preferably scheduled or organized such that the gap between any two consecutive transmissions is less than a configured time period (e.g., 16 μs or 25 μs), as discussed above. In this way, either Category 1 or Category 2 LBT can be chosen to avoid latency incurred by usage of Category 4 LBT operations.

In regard to step 518, in some embodiments, the base station schedules the UEs that are assigned to the shared COT for uplink transmissions within the shared COT using any appropriate scheduling scheme (e.g., a conventional scheduling scheme). For example, see FIG. 5A, steps 518A-518D where uplink grants are sent from the base station to UE1 and UE2 and, in response, UE1 and UE2 transmit uplink transmissions during the shared COT in accordance with the respective uplink grants. As an example of how the base station and the UEs assigned to the shared COT cooperate to schedule or organize the uplink transmissions from the UEs during the shared COT, in some embodiments, the UEs send SRs to the base station and the base station sends respective uplink grants to the UEs during the shared COT. As another example, the base station may already have sufficient information on the buffer status of each of the UEs at the time that the shared COT is determined and schedule the UEs during the shared COT accordingly.

Figure 6:
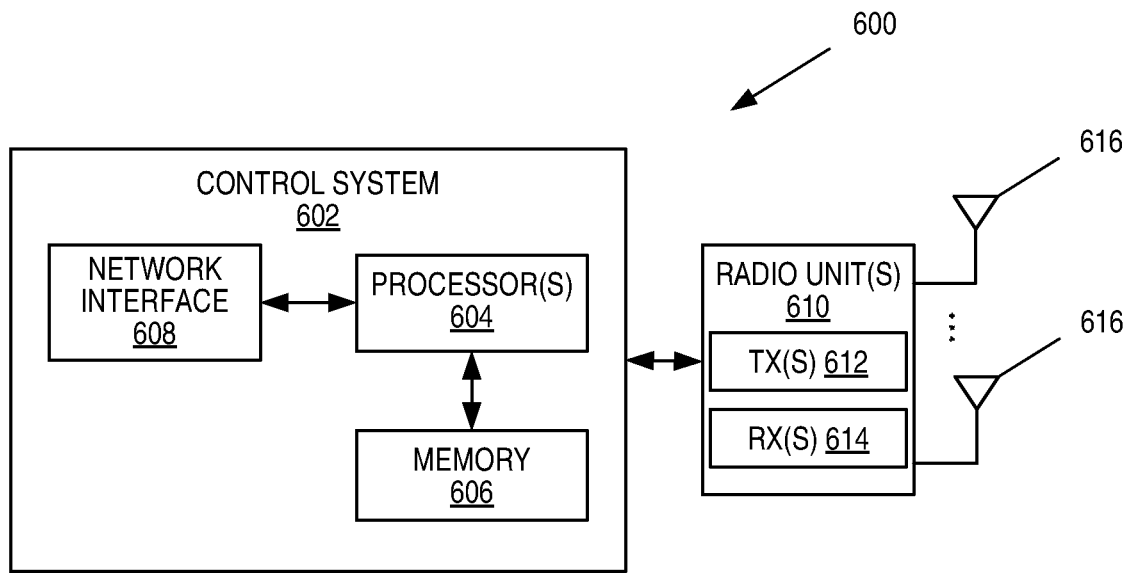
FIGS. 6 through 8 illustrate example embodiments of a radio access node, such as a base station.

FIG. 6 is a schematic block diagram of a radio access node 600 according to some embodiments of the present disclosure. The radio access node 600 may be, for example, a base station 302 or 306. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. In addition, the radio access node 600 includes one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 (e.g., one or more functions of a gNB) as described herein. In some embodiments, the function(s) are implemented in software that is stored, e.g., in the memory 606 and executed by the one or more processors 604.

Figure 7:
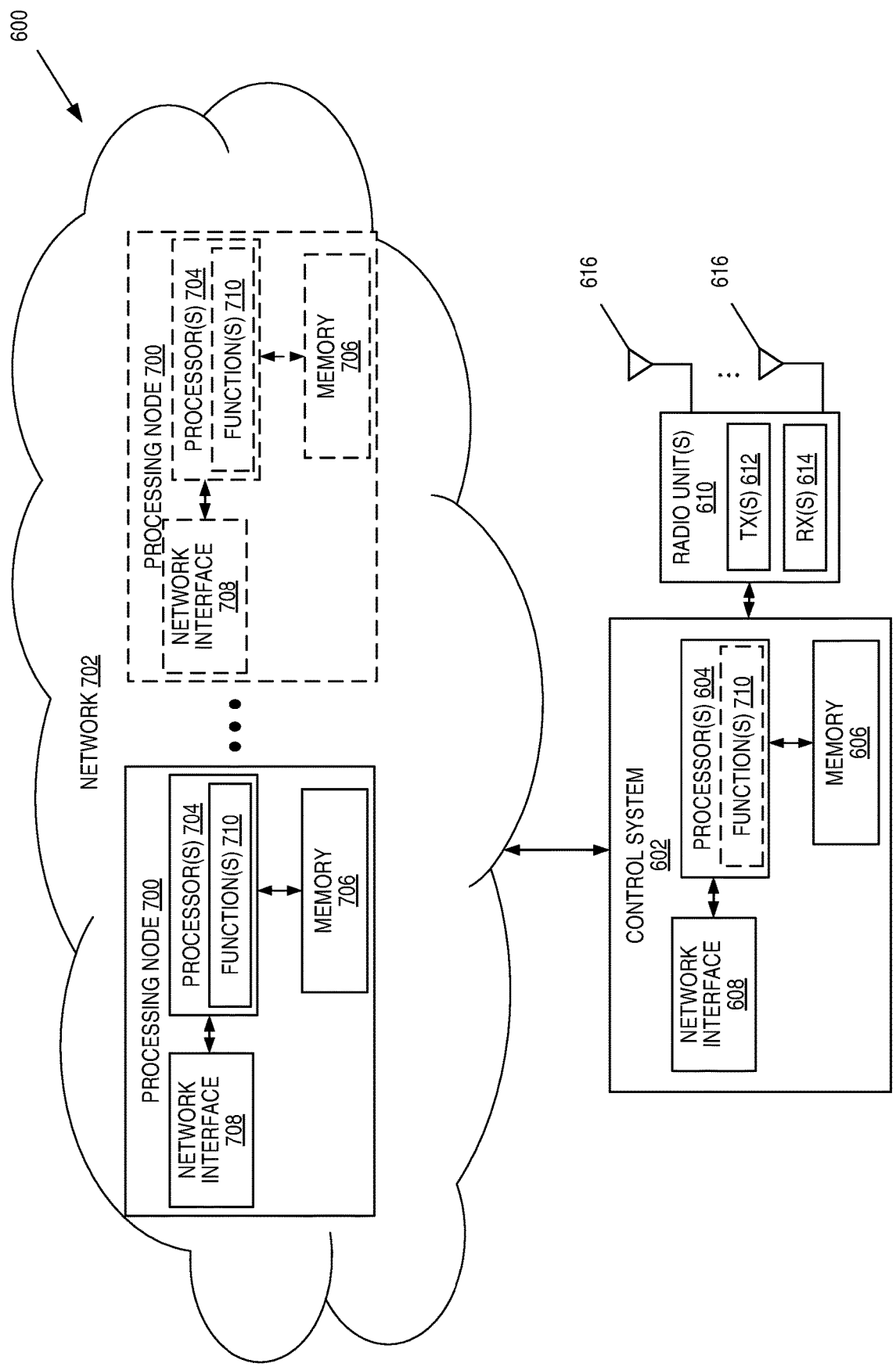

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 includes the control system 602 that includes the one or more processors 604 (e.g., CPUs, ASICs, FPGAs, and/or the like), the memory 606, and the network interface 608 and the one or more radio units 610 that each includes the one or more transmitters 612 and the one or more receivers 614 coupled to the one or more antennas 616, as described above. The control system 602 is connected to the radio unit(s) 610 via, for example, an optical cable or the like. The control system 602 is connected to one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the radio access node 600 (e.g., one or more functions of a gNB) described herein are implemented at the one or more processing nodes 700 or distributed across the control system 602 and the one or more processing nodes 700 in any desired manner. In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of radio access node 600 (e.g., one or more functions of a gNB) or a node (e.g., a processing node 700) implementing one or more of the functions 710 of the radio access node 600 (e.g., one or more functions of a gNB) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
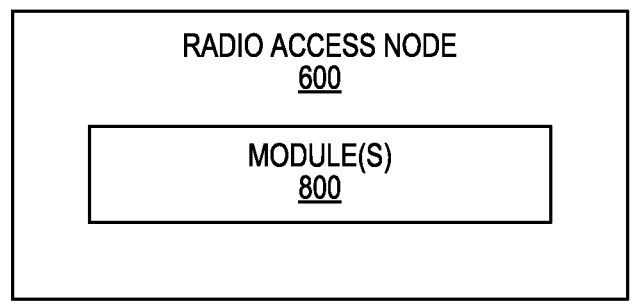

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 (e.g., one or more functions of a gNB) described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
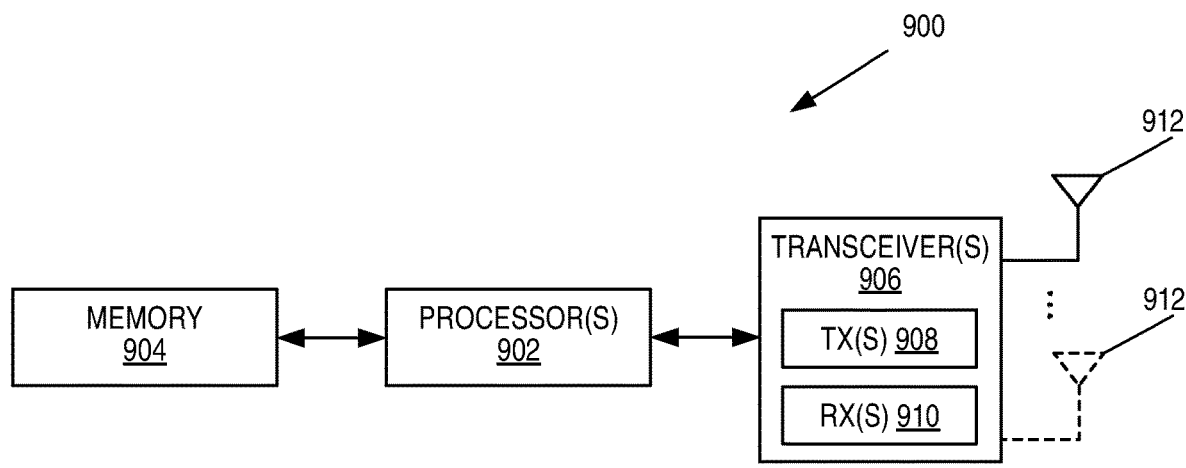
FIGS. 9 and 10 illustrate example embodiments of a UE.

FIG. 9 is a schematic block diagram of a UE 900 according to some embodiments of the present disclosure. As illustrated, the UE 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the UE 900 described above may be fully or partially implemented in software that is, e.g., stored in the memory 904 and executed by the processor(s) 902. Note that the UE 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the UE 900 and/or allowing output of information from the UE 900), a power supply (e.g., a battery and associated power circuitry), etc.

In some embodiments, a computer program including instructions which, when executed by at least one processor, causes the at least one processor to carry out the functionality of the UE 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
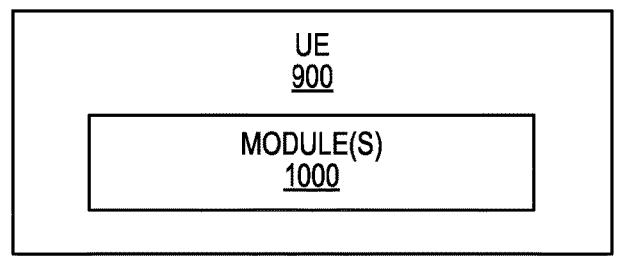

FIG. 10 is a schematic block diagram of the UE 900 according to some other embodiments of the present disclosure. The UE 900 includes one or more modules 1000, each of which is implemented in software. The module(s) 1000 provide the functionality of the UE 900 described herein.

Figure 11:
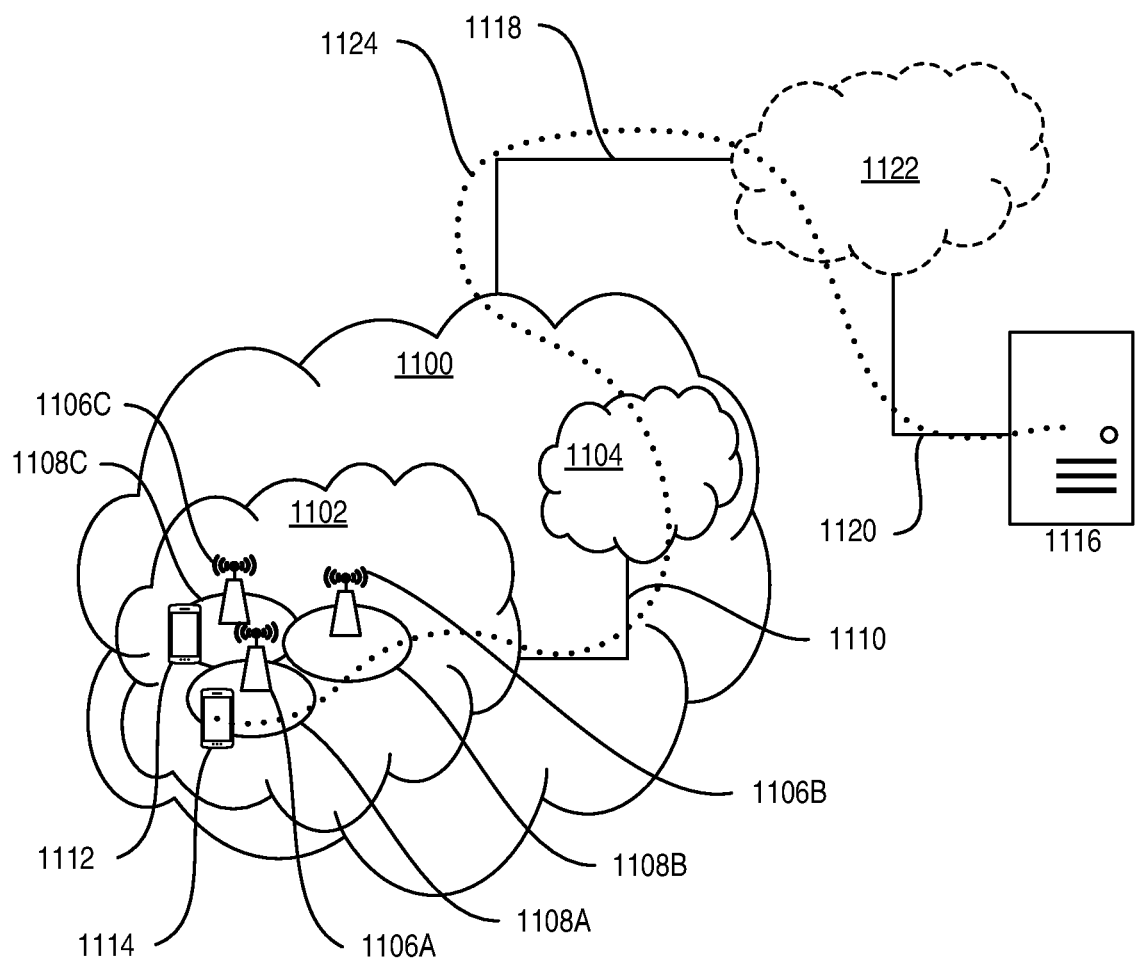
FIG. 11 illustrates an example of a communication system in which embodiments of the present disclosure may be implemented.

With reference to FIG. 11, in accordance with an embodiment, a communication system includes a telecommunication network 1100, such as a 3GPP-type cellular network, which comprises an access network 1102, such as a RAN, and a core network 1104. The access network 1102 comprises a plurality of base stations 1106A, 1106B, 1106C, such as NBs, eNBs, gNBs, or other types of wireless APs, each defining a corresponding coverage area 1108A, 1108B, 1108C. Each base station 1106A, 1106B, 1106C is connectable to the core network 1104 over a wired or wireless connection 1110. A first UE 1112 located in coverage area 1108C is configured to wirelessly connect to, or be paged by, the corresponding base station 1106C. A second UE 1114 in coverage area 1108A is wirelessly connectable to the corresponding base station 1106A. While a plurality of UEs 1112, 1114 are illustrated in this example, the disclosed embodiments are equally applicable to a situation where a sole UE is in the coverage area or where a sole UE is connecting to the corresponding base station 1106.

The telecommunication network 1100 is itself connected to a host computer 1116, which may be embodied in the hardware and/or software of a standalone server, a cloud-implemented server, a distributed server, or as processing resources in a server farm. The host computer 1116 may be under the ownership or control of a service provider, or may be operated by the service provider or on behalf of the service provider. Connections 1118 and 1120 between the telecommunication network 1100 and the host computer 1116 may extend directly from the core network 1104 to the host computer 1116 or may go via an optional intermediate network 1122. The intermediate network 1122 may be one of, or a combination of more than one of, a public, private, or hosted network; the intermediate network 1122, if any, may be a backbone network or the Internet; in particular, the intermediate network 1122 may comprise two or more sub-networks (not shown).

The communication system of FIG. 11 as a whole enables connectivity between the connected UEs 1112, 1114 and the host computer 1116. The connectivity may be described as an Over-the-Top (OTT) connection 1124. The host computer 1116 and the connected UEs 1112, 1114 are configured to communicate data and/or signaling via the OTT connection 1124, using the access network 1102, the core network 1104, any intermediate network 1122, and possible further infrastructure (not shown) as intermediaries. The OTT connection 1124 may be transparent in the sense that the participating communication devices through which the OTT connection 1124 passes are unaware of routing of uplink and downlink communications. For example, the base station 1106 may not or need not be informed about the past routing of an incoming downlink communication with data originating from the host computer 1116 to be forwarded (e.g., handed over) to a connected UE 1112. Similarly, the base station 1106 need not be aware of the future routing of an outgoing uplink communication originating from the UE 1112 towards the host computer 1116.

Example implementations, in accordance with an embodiment, of the UE, base station, and host computer discussed in the preceding paragraphs will now be described with reference to FIG. 12. In a communication system 1200, a host computer 1202 comprises hardware 1204 including a communication interface 1206 configured to set up and maintain a wired or wireless connection with an interface of a different communication device of the communication system 1200. The host computer 1202 further comprises processing circuitry 1208, which may have storage and/or processing capabilities. In particular, the processing circuitry 1208 may comprise one or more programmable processors, ASICs, FPGAs, or combinations of these (not shown) adapted to execute instructions. The host computer 1202 further comprises software 1210, which is stored in or accessible by the host computer 1202 and executable by the processing circuitry 1208. The software 1210 includes a host application 1212. The host application 1212 may be operable to provide a service to a remote user, such as a UE 1214 connecting via an OTT connection 1216 terminating at the UE 1214 and the host computer 1202. In providing the service to the remote user, the host application 1212 may provide user data which is transmitted using the OTT connection 1216.

The communication system 1200 further includes a base station 1218 provided in a telecommunication system and comprising hardware 1220 enabling it to communicate with the host computer 1202 and with the UE 1214. The hardware 1220 may include a communication interface 1222 for setting up and maintaining a wired or wireless connection with an interface of a different communication device of the communication system 1200, as well as a radio interface 1224 for setting up and maintaining at least a wireless connection 1226 with the UE 1214 located in a coverage area (not shown in FIG. 12) served by the base station 1218. The communication interface 1222 may be configured to facilitate a connection 1228 to the host computer 1202. The connection 1228 may be direct or it may pass through a core network (not shown in FIG. 12) of the telecommunication system and/or through one or more intermediate networks outside the telecommunication system. In the embodiment shown, the hardware 1220 of the base station 1218 further includes processing circuitry 1230, which may comprise one or more programmable processors, ASICs, FPGAs, or combinations of these (not shown) adapted to execute instructions. The base station 1218 further has software 1232 stored internally or accessible via an external connection.

The communication system 1200 further includes the UE 1214 already referred to. The UE's 1214 hardware 1234 may include a radio interface 1236 configured to set up and maintain a wireless connection 1226 with a base station serving a coverage area in which the UE 1214 is currently located. The hardware 1234 of the UE 1214 further includes processing circuitry 1238, which may comprise one or more programmable processors, ASICs, FPGAs, or combinations of these (not shown) adapted to execute instructions. The UE 1214 further comprises software 1240, which is stored in or accessible by the UE 1214 and executable by the processing circuitry 1238. The software 1240 includes a client application 1242. The client application 1242 may be operable to provide a service to a human or non-human user via the UE 1214, with the support of the host computer 1202. In the host computer 1202, the executing host application 1212 may communicate with the executing client application 1242 via the OTT connection 1216 terminating at the UE 1214 and the host computer 1202. In providing the service to the user, the client application 1242 may receive request data from the host application 1212 and provide user data in response to the request data. The OTT connection 1216 may transfer both the request data and the user data. The client application 1242 may interact with the user to generate the user data that it provides.

Figure 12:
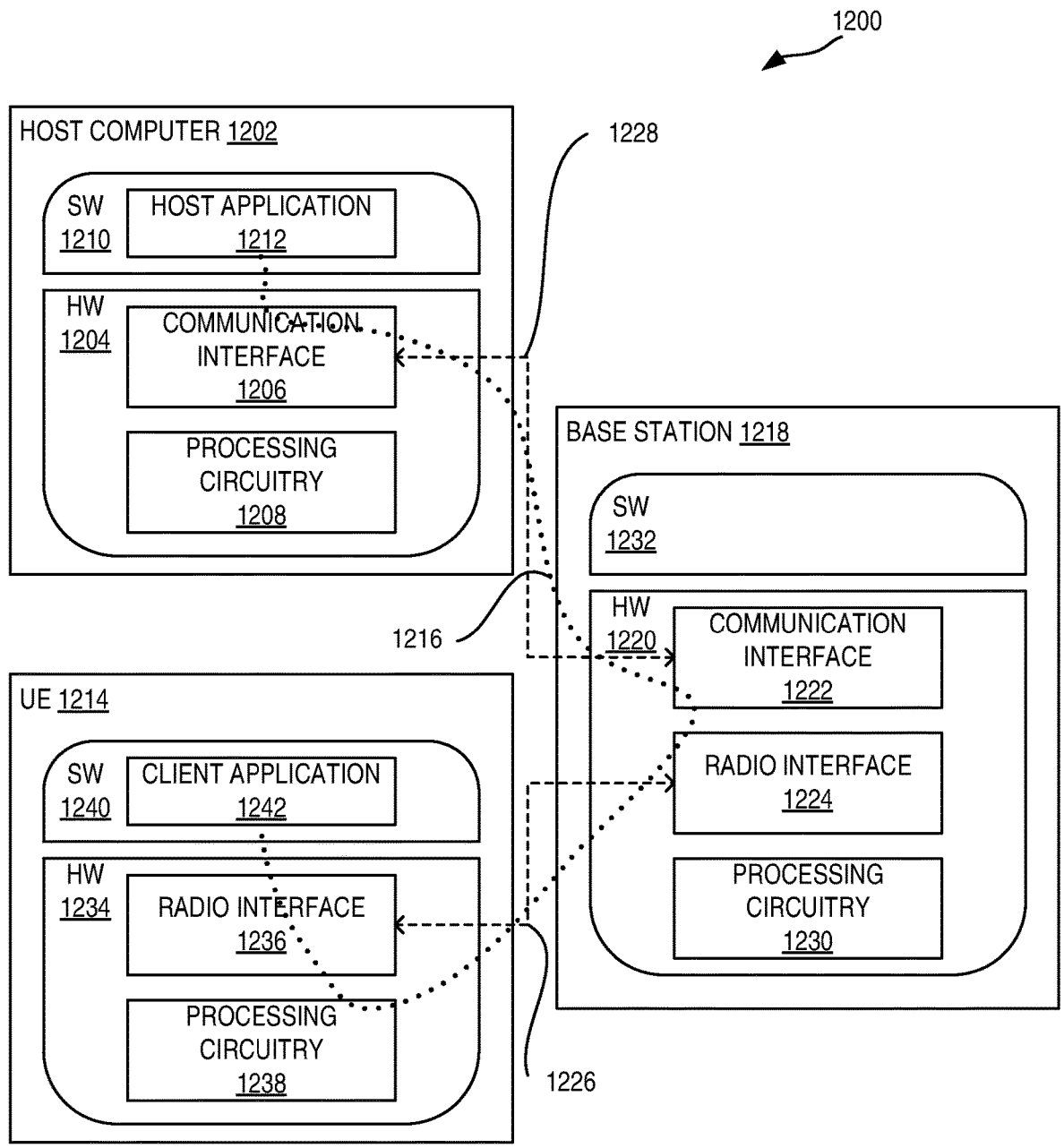
FIG. 12 illustrates example embodiments of a host computer, a base station, and a UE of the communication system of FIG. 11.

It is noted that the host computer 1202, the base station 1218, and the UE 1214 illustrated in FIG. 12 may be similar or identical to the host computer 1116, one of the base stations 1106A, 1106B, 1106C, and one of the UEs 1112, 1114 of FIG. 11, respectively. This is to say, the inner workings of these entities may be as shown in FIG. 12 and independently, the surrounding network topology may be that of FIG. 11.

In FIG. 12, the OTT connection 1216 has been drawn abstractly to illustrate the communication between the host computer 1202 and the UE 1214 via the base station 1218 without explicit reference to any intermediary devices and the precise routing of messages via these devices. The network infrastructure may determine the routing, which may be configured to hide from the UE 1214 or from the service provider operating the host computer 1202, or both. While the OTT connection 1216 is active, the network infrastructure may further take decisions by which it dynamically changes the routing (e.g., on the basis of load balancing consideration or reconfiguration of the network).

The wireless connection 1226 between the UE 1214 and the base station 1218 is in accordance with the teachings of the embodiments described throughout this disclosure. One or more of the various embodiments improve the performance of OTT services provided to the UE 1214 using the OTT connection 1216, in which the wireless connection 1226 forms the last segment. More precisely, the teachings of these embodiments may improve data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1216 between the host computer 1202 and the UE 1214, in response to variations in the measurement results. The measurement procedure and/or the network functionality for reconfiguring the OTT connection 1216 may be implemented in the software 1210 and the hardware 1204 of the host computer 1202 or in the software 1240 and the hardware 1234 of the UE 1214, or both. In some embodiments, sensors (not shown) may be deployed in or in association with communication devices through which the OTT connection 1216 passes; the sensors may participate in the measurement procedure by supplying values of the monitored quantities exemplified above, or supplying values of other physical quantities from which the software 1210, 1240 may compute or estimate the monitored quantities. The reconfiguring of the OTT connection 1216 may include message format, retransmission settings, preferred routing, etc.; the reconfiguring need not affect the base station 1218, and it may be unknown or imperceptible to the base station 1218. Such procedures and functionalities may be known and practiced in the art. In certain embodiments, measurements may involve proprietary UE signaling facilitating the host computer 1202's measurements of throughput, propagation times, latency, and the like. The measurements may be implemented in that the software 1210 and 1240 causes messages to be transmitted, in particular empty or 'dummy' messages, using the OTT connection 1216 while it monitors propagation times, errors, etc.

FIG. 13 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 13 will be included in this section. In step 1300, the host computer provides user data. In sub-step 1302 (which may be optional) of step 1300, the host computer provides the user data by executing a host application. In step 1304, the host computer initiates a transmission carrying the user data to the UE. In step 1306 (which may be optional), the base station transmits to the UE the user data which was carried in the transmission that the host computer initiated, in accordance with the teachings of the embodiments described throughout this disclosure. In step 1308 (which may also be optional), the UE executes a client application associated with the host application executed by the host computer.

FIG. 14 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 14 will be included in this section. In step 1400 of the method, the host computer provides user data. In an optional sub-step (not shown) the host computer provides the user data by executing a host application. In step 1402, the host computer initiates a transmission carrying the user data to the UE. The transmission may pass via the base station, in accordance with the teachings of the embodiments described throughout this disclosure. In step 1404 (which may be optional), the UE receives the user data carried in the transmission.

FIG. 15 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 15 will be included in this section. In step 1500 (which may be optional), the UE receives input data provided by the host computer. Additionally or alternatively, in step 1502, the UE provides user data. In sub-step 1504 (which may be optional) of step 1500, the UE provides the user data by executing a client application. In sub-step 1506 (which may be optional) of step 1502, the UE executes a client application which provides the user data in reaction to the received input data provided by the host computer. In providing the user data, the executed client application may further consider user input received from the user. Regardless of the specific manner in which the user data was provided, the UE initiates, in sub-step 1508 (which may be optional), transmission of the user data to the host computer. In step 1510 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 16 will be included in this section. In step 1600 (which may be optional), in accordance with the teachings of the embodiments described throughout this disclosure, the base station receives user data from the UE. In step 1602 (which may be optional), the base station initiates transmission of the received user data to the host computer. In step 1604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless device for wireless device initiated sharing of a Channel Occupancy Time, COT, in a wireless system operating in unlicensed spectrum, the method comprising: performing (502) a Listen-Before-Talk, LBT, procedure, a result of the LBT procedure being an LBT success; transmitting (504), to a base station, one or more messages that initiate COT sharing between the wireless device and one or more additional wireless devices for uplink transmission; receiving (506) COT information from the base station, the COT information being information related to a shared COT to be used by the wireless device and one or more additional wireless devices for uplink transmission; and cooperating (518) with the base station to perform one or more uplink transmissions during the shared COT.

Embodiment 2: The method of embodiment 1 wherein the COT information comprises any one or more of the following:
- information that indicates a time when the shared COT starts;
- information that indicates a time when the shared COT ends;
- information that indicates a COT category of the shared COT;
- information that indicates one or more times at which a uplink/downlink switch may occur during the shared COT;
- information that indicates a maximum number of switch events between uplink and downlink during the shared COT;
- information that indicates a set of wireless devices are allowed to share the shared COT, the set of wireless devices comprising the wireless device and one or more additional wireless devices;
- information that indicates services, logical channels, logical channel groups, and/or channel access priority classes that are allowed to transmit within the shared COT;
- information that indicates what control signaling and/or data is allowed to be transmitted within the shared COT;
- information that indicates one or more type(s) of LBT operations that can be used in the shared COT;
- uplink grants associated to wireless devices in the set of wireless devices that are allowed to share the shared COT; and/or
- information that indicates time positions reserved for potential discovery reference signal transmissions.

Embodiment 3: The method of embodiment 1 or 2 wherein the one or more messages that initiate COT sharing comprise:
- a scheduling request comprising information that indicates: (a) one or more services, one or more logical channels, or one or more logical channel groups with data available at the wireless device for transmission and (b) a buffer status of the data available at the wireless device for transmission; or
- messages for a two-step random access procedure comprising a message that comprises at least a buffer status report for data available at the wireless device for transmission; or
- a scheduling request and one or more subsequent buffer status reports for data available at the wireless device for transmission; or
- a message(s) comprising uplink control information, the uplink control information comprising a buffer status report for data available at the wireless device for transmission.

Embodiment 4: The method of any one of embodiments 1 to 3 further comprising: determining if the wireless device is assigned to the shared COT for uplink transmission; and adapting physical downlink control channel monitoring by the wireless device based on determining if the wireless device is assigned to the shared COT.

Embodiment 5: The method of embodiment 4 wherein adapting physical downlink control channel monitoring by the wireless device based on determining if the wireless device is assigned to the shared COT comprises increasing how often the wireless device monitors for a physical downlink control channel transmission from the base station during the shared COT.

Embodiment 6: The method of embodiment 4 wherein adapting physical downlink control channel monitoring by the wireless device based on determining if the wireless device is not assigned to the shared COT comprises decreasing how often the wireless device monitors for a physical downlink control channel transmission from the base station during the shared COT.

Embodiment 7: The method of embodiment 4 wherein adapting physical downlink control channel monitoring by the wireless device based on determining if the wireless device is assigned to the shared COT comprises switching a physical downlink control channel monitoring pattern from a first pattern to a second pattern, where the second pattern has different physical downlink control channel monitoring occasions (e.g., a higher or lower monitoring frequency) than the first pattern.

Embodiment 8: The method of any one of embodiments 1 to 7 further comprising: determining if the wireless device is assigned to the shared COT for uplink transmission; and adapting a Discontinuous Reception, DRX, configuration of the wireless device based on determining if the wireless device is assigned to the shared COT.

Embodiment 9: The method of any one of embodiments 1 to 7 further comprising: determining if the wireless device is assigned to the shared COT for uplink transmission; and adapting a Discontinuous Reception, DRX, configuration (e.g., with more often/longer active period) of the wireless device.

Embodiment 10: The method of any one of embodiments 1 to 7 further comprising: determining if the wireless device is not assigned to the shared COT for uplink transmission; and adapting a Discontinuous Reception, DRX, configuration (e.g., with less often/short active period) of the wireless device.

Embodiment 11: The method of any one of embodiments 1 to 10 wherein cooperating (518) with the base station to perform one or more uplink transmissions during the shared COT comprises: receiving an uplink grant for an uplink transmission from the wireless device during the shared COT; and transmitting the uplink transmission during the shared COT in accordance with the uplink grant.

Embodiment 12: The method of any one of embodiments 1 to 11 wherein cooperating (518) with the base station to perform one or more uplink transmissions during the shared COT comprises cooperating (518) with the base station such that uplink transmissions by wireless devices assigned to the shared COT are scheduled or organized in such a way that the wireless devices assigned to the shared COT share the shared COT (e.g., an uplink transmission from one of the wireless devices during the shared COT does not block an uplink transmission from the other wireless devices during the shared COT; an uplink transmission from one of the wireless devices during the shared COT may occur at the same time with an uplink transmission from the other wireless devices during the shared COT, using different resources).

Embodiment 13: The method of any one of embodiments 1 to 12 wherein cooperating (518) with the base station to perform one or more uplink transmissions during the shared COT comprises cooperating (518) with the base station such that a gap between any two consecutive uplink transmissions by the wireless devices assigned to the shared COT that occur during the shared COT is less than a configured time period (e.g., 16 microseconds, µs, or 25 µs).

Embodiment 14: The method of any one of embodiments 1 to 13 wherein receiving (506) COT information from the base station comprises receiving (506) the COT information from the base station via any one of the following types of signaling:
- downlink control information based signaling;
- Medium Access Control, MAC, Control Element, CE, based signaling;
- higher layer signaling (e.g., Radio Resource Control, RRC, signaling); or
- downlink feedback information.

Embodiment 15: The method of any one of embodiments 1 to 14 wherein the COT information is signaled in such a manner that the COT information can be read by all wireless devices operating on a respective cell, carrier, bandwidth part, channel, subband, or group.

Embodiment 16: The method of any one of embodiments 1 to 15 wherein wireless device initiated COT sharing for uplink transmissions is configured per service, logical channel, logical channel group, or channel access priority class.

Embodiment 17: The method of any of the previous embodiments, further comprising: providing user data; and forwarding the user data to a host computer via the transmission to the base station.

Group B Embodiments

Embodiment 18: A method performed by a base station for wireless device initiated sharing of a Channel Occupancy Time, COT, in a wireless system operating in unlicensed spectrum, the method comprising: receiving (504), from a wireless device, one or more messages that initiate COT sharing between the wireless device and one or more additional wireless devices for uplink transmission; transmitting (506) COT information, the COT information being information related to a shared COT to be used by a set of wireless devices assigned to the shared COT for uplink transmission, wherein the set of wireless devices assigned to the shared COT comprises the wireless device and one or more additional wireless devices; and cooperating (518) with the wireless devices in the set of wireless devices assigned to the shared COT to schedule and organize transmissions from the wireless devices during the shared COT.

Embodiment 19: The method of embodiment 18 wherein the COT information comprises any one or more of the following:
- information that indicates a time when the shared COT starts;
- information that indicates a time when the shared COT ends;
- information that indicates a COT category of the shared COT;
- information that indicates one or more times at which a uplink/downlink switch may occur during the shared COT;
- information that indicates a maximum number of switch events between uplink and downlink during the shared COT;
- information that indicates a set of wireless devices are allowed to share the shared COT, the set of wireless devices comprising the wireless device and one or more additional wireless devices;
- information that indicates services, logical channels, logical channel groups, and/or channel access priority classes that are allowed to transmit within the shared COT;
- information that indicates what control signaling and/or data is allowed to be transmitted within the shared COT;
- information that indicates one or more type(s) of Listen-Before-Talk, LBT, operations that can be used in the shared COT;
- uplink grants associated to wireless devices in the set of wireless devices that are allowed to share the shared COT; and/or
- information that indicates time positions reserved for potential demodulation reference signal transmissions.

Embodiment 20: The method of embodiment 18 or 19 wherein the one or more messages that initiate COT sharing comprise:
- a scheduling request comprising information that indicates: (a) one or more services, one or more logical channels, or one or more logical channel groups with data available at the wireless device for transmission and (b) a buffer status of the data available at the wireless device for transmission; or
- messages for a two-step random access procedure comprising a message that comprises a buffer status report for data available at the wireless device for transmission; or
- a scheduling request and one or more subsequent buffer status reports for data available at the wireless device for transmission; or
- a message(s) comprising uplink control information, the uplink control information comprising a buffer status report for data available at the wireless device for transmission.

Embodiment 21: The method of any one of embodiments 18 to 20 wherein cooperating (518) with the wireless devices in the set of wireless devices assigned to the shared COT to schedule and organize transmissions from the wireless devices during the shared COT comprises: transmitting, to the wireless devices in the set of wireless devices assigned to the shared COT, respective uplink grants for uplink transmissions by the wireless devices during the shared COT; and receiving the uplink transmissions from the wireless devices during the shared COT in accordance with the uplink grants.

Embodiment 22: The method of any one of embodiments 18 to 21 wherein cooperating (518) with the wireless devices in the set of wireless devices assigned to the shared COT to schedule and organize transmissions from the wireless devices during the shared COT comprises cooperating (518) the wireless devices such that uplink transmissions by the wireless devices are scheduled and organized in such a way that the wireless devices assigned to the shared COT share the shared COT (e.g., an uplink transmission from one of the wireless devices during the shared COT does not block an uplink transmission from the other wireless devices during the shared COT; an uplink transmission from one of the wireless devices during the shared COT may occur at the same time with an uplink transmission from the other wireless devices during the shared COT, using different resources).

Embodiment 23: The method of any one of embodiments 18 to 22 wherein cooperating (518) with the wireless devices in the set of wireless devices assigned to the shared COT to schedule and organize transmissions from the wireless devices during the shared COT comprises cooperating (518)

with wireless devices such that a gap between any two consecutive uplink transmissions by the wireless devices assigned that occur during the shared COT is less than a configured time period (e.g., 16 microseconds, µs, or 25 µs).

Embodiment 24: The method of any one of embodiments 18 to 23 wherein transmitting (506) the COT information comprises transmitting (506) the COT information via any one of the following types of signaling:
- downlink control information based signaling;
- Medium Access Control, MAC, Control Element, CE, based signaling;
- higher layer signaling (e.g., Radio Resource Control, RRC, signaling); or
- downlink feedback information.

Embodiment 25: The method of any one of embodiments 18 to 24 wherein the COT information is signaled in such a manner that the COT information can be read by all wireless devices operating on a respective cell, carrier, bandwidth part, channel, or subband.

Embodiment 26: The method of any one of embodiments 18 to 25 wherein wireless device initiated COT sharing for uplink transmissions is configured per service, logical channel, logical channel group, or channel access priority class.

Embodiment 27: The method of any of the previous embodiments, further comprising: obtaining user data; and forwarding the user data to a host computer or a wireless device.

Group C Embodiments

Embodiment 28: A wireless device comprising: processing circuitry configured to perform any of the steps of any of the Group A embodiments; and power supply circuitry configured to supply power to the wireless device.

Embodiment 29: A base station comprising: processing circuitry configured to perform any of the steps of any of the Group B embodiments; and power supply circuitry configured to supply power to the base station.

Embodiment 30: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 31: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 32: The communication system of the previous embodiment further including the base station.

Embodiment 33: The communication system of the previous 2 embodiments, further including the UE, wherein the UE is configured to communicate with the base station.

Embodiment 34: The communication system of the previous 3 embodiments, wherein: the processing circuitry of the host computer is configured to execute a host application, thereby providing the user data; and the UE comprises processing circuitry configured to execute a client application associated with the host application.

Embodiment 35: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 36: The method of the previous embodiment, further comprising, at the base station, transmitting the user data.

Embodiment 37: The method of the previous 2 embodiments, wherein the user data is provided at the host computer by executing a host application, the method further comprising, at the UE, executing a client application associated with the host application.

Embodiment 38: A User Equipment, UE, configured to communicate with a base station, the UE comprising a radio interface and processing circuitry configured to perform the method of the previous 3 embodiments.

Embodiment 39: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 40: The communication system of the previous embodiment, wherein the cellular network further includes a base station configured to communicate with the UE.

Embodiment 41: The communication system of the previous 2 embodiments, wherein: the processing circuitry of the host computer is configured to execute a host application, thereby providing the user data; and the UE's processing circuitry is configured to execute a client application associated with the host application.

Embodiment 42: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 43: The method of the previous embodiment, further comprising at the UE, receiving the user data from the base station.

Embodiment 44: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 45: The communication system of the previous embodiment, further including the UE.

Embodiment 46: The communication system of the previous 2 embodiments, further including the base station, wherein the base station comprises a radio interface configured to communicate with the UE and a communication interface configured to forward to the host computer the user data carried by a transmission from the UE to the base station.

Embodiment 47: The communication system of the previous 3 embodiments, wherein: the processing circuitry of the host computer is configured to execute a host application; and The UE's processing circuitry is configured to execute a client application associated with the host application, thereby providing the user data.

Embodiment 48: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 49: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 50: The method of the previous embodiment, further comprising, at the UE, providing the user data to the base station.

Embodiment 51: The method of the previous 2 embodiments, further comprising: at the UE, executing a client application, thereby providing the user data to be transmitted; and at the host computer, executing a host application associated with the client application.

Embodiment 52: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 53: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 54: The communication system of the previous embodiment further including the base station.

Embodiment 55: The communication system of the previous 2 embodiments, further including the UE, wherein the UE is configured to communicate with the base station.

Embodiment 56: The communication system of the previous 3 embodiments, wherein: the processing circuitry of the host computer is configured to execute a host application; and the UE is configured to execute a client application associated with the host application, thereby providing the user data to be received by the host computer.

Embodiment 57: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 58: The method of the previous embodiment, further comprising at the base station, receiving the user data from the UE.

Embodiment 59: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
ACK Acknowledgement
AP Access Point
ASIC Application Specific Integrated Circuit
BSR Buffer Status Report
BWP Bandwidth Part
CAPC Channel Access Priority Class
CCA Clear Chanel Assessment
CE Control Element
COT Channel Occupancy Time
CPU Central Processing Unit
CSI-RS Channel State Information Reference Signal
CWS Contention Window Size
DC Dual Connectivity
DCI Downlink Control Information
DFI Downlink Feedback Information
DRS Discovery Reference Signal
DRX Discontinuous Reception
DSP Digital Signal Processor
ED Energy Detection
eLAA Enhanced License Assisted Access
eNB Enhanced or Evolved Node B
feLAA Further Enhanced License Assisted Access
FPGA Field Programmable Gate Array
GC-PDCCH Group Common Physical Downlink Control Channel
GHz Gigahertz
gNB Next Generation Base Station
ID Identifier
IoT Internet of Things
LAA License Assisted Access
LBT Listen-Before-Talk
LCG Logical Channel Group
LCH Logical Channel
LTE Long Term Evolution
MAC Medium Access Control
MCOT Maximum Channel Occupancy Time
MME Mobility Management Entity
ms Millisecond
MTC Machine Type Communication
NR New Radio
NR-U New Radio Unlicensed
OFDM Orthogonal Frequency Division Multiplexing
OTT Over-the-Top
PBCH Physical Broadcast Channel
PDCCH Physical Downlink Control Channel
PDSCH Physical Downlink Shared Channel
PDU Protocol Data Unit
P-GW Packet Data Network Gateway
PHR Power Headroom Report
PRACH Physical Random Access Channel
PSS Primary Synchronization Signal
PUCCH Physical Uplink Control Channel
PUSCH Physical Uplink Shared Channel QoS Quality of Service
RA Random Access
RACH Random Access Channel
RAM Random Access Memory
RAT Radio Access Technology
RMTC Received Signal Strength Indicator Measurement Timing Configuration
ROM Read Only Memory
RRC Radio Resource Control
RRH Remote Radio Head
RRM Radio Resource Management
RSRP Reference Signal Received Power
RSRQ Reference Signal Received Quality
RSSI Received Signal Strength Indicator
SCEF Service Capability Exposure Function
SIFS Short Interframe Spacing
SR Scheduling Request
SRS Sounding Reference Signal
SSS Secondary Synchronization Signal
STA Station
TR Technical Report
TS Technical Specification
TTI Transmission Time Interval
TXOP Transmission Opportunity
UCI Uplink Control Information
UE User Equipment
UL-SCH Uplink Shared Channel
UP User Plane
VoIP Voice over Internet Protocol Those skilled in the art will recognize improvements and modifications to the embodiments of the present disclosure. All such improvements and modifications are considered within the scope of the concepts disclosed herein.

What is claimed is:

1. A method performed by a wireless device for wireless device initiated sharing of a Channel Occupancy Time, COT, in a wireless system operating in unlicensed spectrum, the method comprising:
    performing a Listen-Before-Talk, LBT, procedure, a result of the LBT procedure being an LBT success;
    transmitting, to a base station, one or more messages that initiate COT sharing between the wireless device and one or more additional wireless devices;
    receiving COT information from the base station, the COT information being information related to a shared COT to be used by the wireless device and one or more additional wireless devices; and
    cooperating with the base station to utilize the shared COT, such that a gap between any two consecutive transmissions during the shared COT is less than a configured time period.

2. The method of claim 1 wherein the COT information comprises:
    a) information that indicates a time when the shared COT starts; or
    b) information that indicates a time when the shared COT ends; or
    c) information that indicates a COT category of the shared COT; or
    d) information that indicates one or more times at which a uplink/downlink switch may occur during the shared COT; or
    e) information that indicates a maximum number of switch events between uplink and downlink during the shared COT; or
    f) information that indicates a set of wireless devices are allowed to share the shared COT, the set of wireless devices comprising the wireless device and one or more additional wireless devices; or
    g) information that indicates services, logical channels, logical channel groups, and/or channel access priority classes that are allowed to transmit within the shared COT; or
    h) information that indicates what control signaling and/or data is allowed to be transmitted within the shared COT; or
    i) information that indicates one or more type(s) of Listen-Before-Talk, LBT, operations that can be used in the shared COT; or
    j) uplink grants associated to wireless devices in the set of wireless devices that are allowed to share the shared COT; or
    k) information that indicates time positions reserved for potential demodulation reference signal transmissions; or
    l) any combination of two or more of (a)-(k).

3. The method of claim 1 wherein the one or more messages that initiate COT sharing comprise:
    a scheduling request comprising information that indicates: (a) one or more services, one or more logical channels, or one or more logical channel groups with data available at the wireless device for transmission and (b) a buffer status of the data available at the wireless device for transmission; or
    messages for a two-step random access procedure comprising a message that comprises at least a buffer status report for data available at the wireless device for transmission; or
    a scheduling request and one or more subsequent buffer status reports for data available at the wireless device for transmission; or
    a message(s) comprising uplink control information, the uplink control information comprising a buffer status report for data available at the wireless device for transmission.

4. The method of claim 1 further comprising:
    determining that the wireless device is assigned to the shared COT; and
    adapting physical downlink control channel monitoring by the wireless device based on determining that the wireless device is assigned to the shared COT.

5. The method of claim 4 wherein determining that the wireless device is assigned to the shared COT comprises determining that the wireless device is assigned to the shared COT based on information comprised in the shared COT that indicates that the wireless device is one of a set of wireless devices allowed to share the shared COT.

6. The method of claim 4 further comprising:
    receiving, from the base station, an indication that the wireless device is allowed to share the shared COT;
    wherein determining that the wireless device is assigned to the shared COT comprises determining that the wireless device is assigned to the shared COT based on the received indication.

7. The method of claim 4 wherein adapting physical downlink control channel monitoring by the wireless device based on determining that the wireless device is assigned to the shared COT comprises increasing how often the wireless device monitors for a physical downlink control channel transmission from the base station during the shared COT.

8. The method of claim 4 wherein adapting physical downlink control channel monitoring by the wireless device based on determining if the wireless device is assigned to the shared COT comprises switching a physical downlink control channel monitoring pattern from a first pattern to a second pattern, where the second pattern has different physical downlink control channel monitoring occasions than the first pattern.

9. The method of claim 1 further comprising:
determining that the wireless device is assigned to the shared COT; and
adapting a Discontinuous Reception, DRX, configuration of the wireless device based on determining that the wireless device is assigned to the shared COT.

10. The method of claim 9 wherein adapting the DRX configuration of the wireless device based on determining that the wireless device is assigned to the shared COT comprises decreasing a DRX cycle length of the DRX configuration of the wireless device or increasing a duration of an active period of the DRX configuration of the wireless device.

11. The method of claim 1 wherein cooperating with the base station to utilize the shared COT comprises cooperating with the base station to perform one or more uplink transmissions during the shared COT.

12. The method of claim 11 wherein cooperating with the base station to perform one or more uplink transmissions during the shared COT comprises:
receiving an uplink grant for an uplink transmission during the shared COT; and
transmitting the uplink transmission during the shared COT in accordance with the uplink grant.

13. The method of claim 1 wherein receiving the COT information from the base station comprises receiving the COT information from the base station via any one of the following types of signaling:
downlink control information based signaling; or
Medium Access Control, MAC, Control Element, CE, based signaling; or
higher layer signaling; or
downlink feedback information.

14. The method of claim 1 wherein the COT information is signaled in such a manner that the COT information can be read by all wireless devices operating on a respective cell, carrier, bandwidth part, channel, subband, or group.

15. The method of claim 1 wherein wireless device initiated COT sharing is configured per service, logical channel, logical channel group, or channel access priority class.

16. A method performed by a wireless device for sharing of a Channel Occupancy Time, COT, in a wireless system operating in unlicensed spectrum, the method comprising:
receiving COT information from a base station, the COT information being information related to a shared COT to be used by one or more wireless devices;
determining whether the wireless device is allowed to share the shared COT; and
either cooperating with the base station to utilize the shared COT, such that a gap between any two consecutive transmissions during the shared COT is less than a configured time period, or not, based on a result of determining whether the wireless device is allowed to share the shared COT.

17. The method of claim 16 further comprising:
receiving, from the base station, an indication that the wireless device is allowed to share the shared COT;
wherein determining whether the wireless device is allowed to share the shared COT comprises determining that the wireless device is assigned to the shared COT based on the received indication.

18. The method of claim 16 further comprising adapting physical downlink control channel monitoring by the wireless device based on a result of determining whether the wireless device is allowed to share the shared COT.

19. The method of claim 16 further comprising adapting a Discontinuous Reception, DRX, configuration of the wireless device based on a result of determining whether the wireless device) is allowed to share the shared COT.

20. A method performed by a base station for wireless device initiated sharing of a Channel Occupancy Time, COT, in a wireless system operating in unlicensed spectrum, the method comprising:
receiving, from a wireless device, one or more messages that initiate COT sharing between the wireless device and one or more additional wireless devices;
transmitting COT information, the COT information being information related to a shared COT to be used by a set of wireless devices assigned to the shared COT, wherein the set of wireless devices assigned to the shared COT comprises the wireless device and one or more additional wireless devices; and
cooperating with the wireless devices in the set of wireless devices assigned to utilize the shared COT, such that a gap between any two consecutive transmissions during the shared COT is less than a configured time period.

\* \* \* \* \*